United States Patent
Imai et al.

(10) Patent No.: US 9,940,690 B2
(45) Date of Patent: Apr. 10, 2018

(54) TERMINAL APPARATUS AND SCREEN UPDATING METHOD

(71) Applicant: FUJITSU LIMITED, Kawasaki-shi, Kanagawa (JP)

(72) Inventors: Tomoharu Imai, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/012,079

(22) Filed: Feb. 1, 2016

(65) Prior Publication Data
US 2016/0239940 A1 Aug. 18, 2016

(30) Foreign Application Priority Data
Feb. 16, 2015 (JP) ................................ 2015-027609

(51) Int. Cl.
*G09G 5/36* (2006.01)
*G06T 1/60* (2006.01)
*G06F 3/0485* (2013.01)
*G06F 9/44* (2018.01)

(52) U.S. Cl.
CPC .............. *G06T 1/60* (2013.01); *G06F 3/0485* (2013.01); *G06F 9/4443* (2013.01)

(58) Field of Classification Search
CPC .................... G06F 17/30902; G06F 3/0485
See application file for complete search history.

(56) References Cited

U.S. PATENT DOCUMENTS

| 5,053,761 A * | 10/1991 | Webster, III | G09G 5/346 345/590 |
| 7,346,842 B1 * | 3/2008 | Hayton | G06F 17/30902 705/64 |
| 2007/0146377 A1 * | 6/2007 | Villers | G09G 5/346 345/573 |
| 2012/0072819 A1 * | 3/2012 | Lindner | G06F 3/0485 715/211 |
| 2012/0198330 A1 * | 8/2012 | Koppel | G06F 17/217 715/251 |
| 2013/0156269 A1 | 6/2013 | Matsui et al. | |

FOREIGN PATENT DOCUMENTS

| JP | 2012-079222 | 4/2012 |
| JP | 2013-130967 | 7/2013 |

* cited by examiner

*Primary Examiner* — Thomas Lett
(74) *Attorney, Agent, or Firm* — Fujitsu Patent Center

(57) ABSTRACT

A terminal apparatus includes: a buffer memory that stores rendering data displayed on a display device; and a processor that acquires, according to scroll operation of the display device, rendering data including a connection portion, which is connected to a residual portion displayed in a moving destination region on a screen after the scroll operation from a screen before the scroll operation and is displayed, stores, in the buffer memory for storing the rendering data including the moving destination region and the connection portion, the rendering data of the residual portion and the rendering data including the connection portion, and outputs, in response to update of a display position of the rendering data stored in the buffer memory, the rendering data, the display position of which is updated, to the display device after the scroll operation.

12 Claims, 11 Drawing Sheets

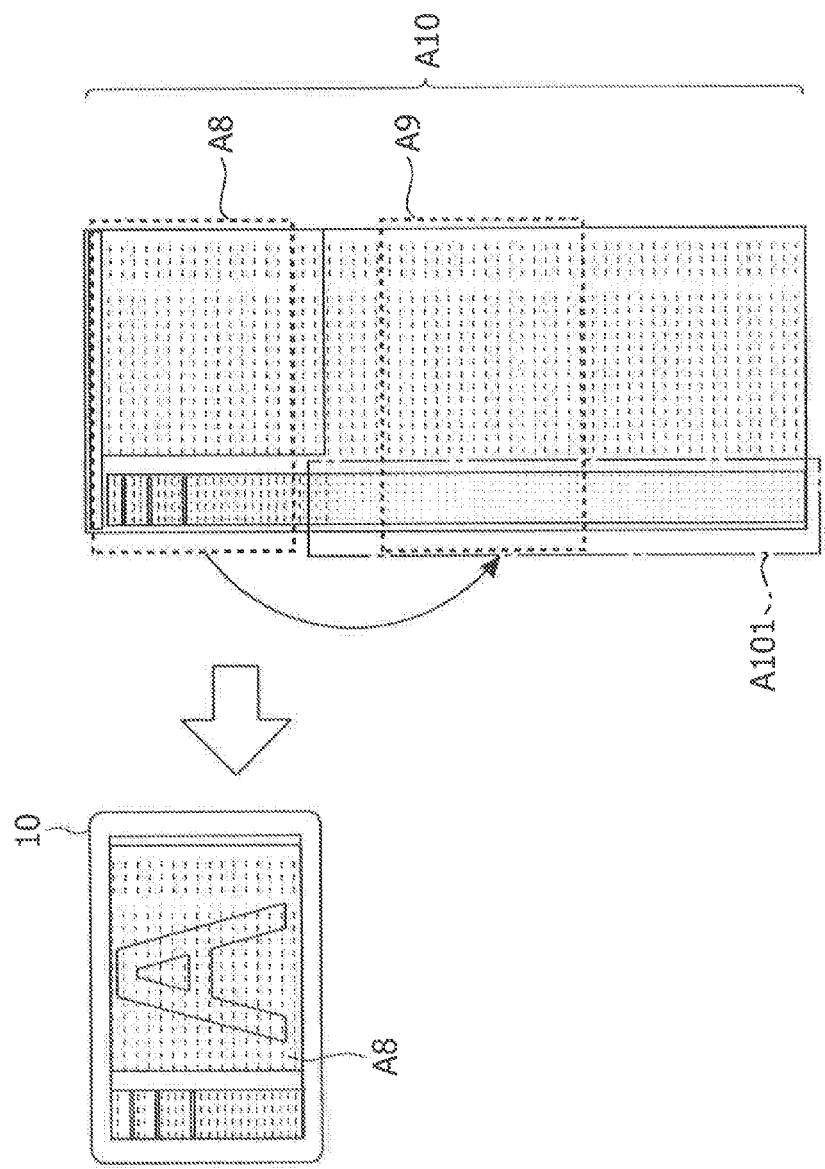

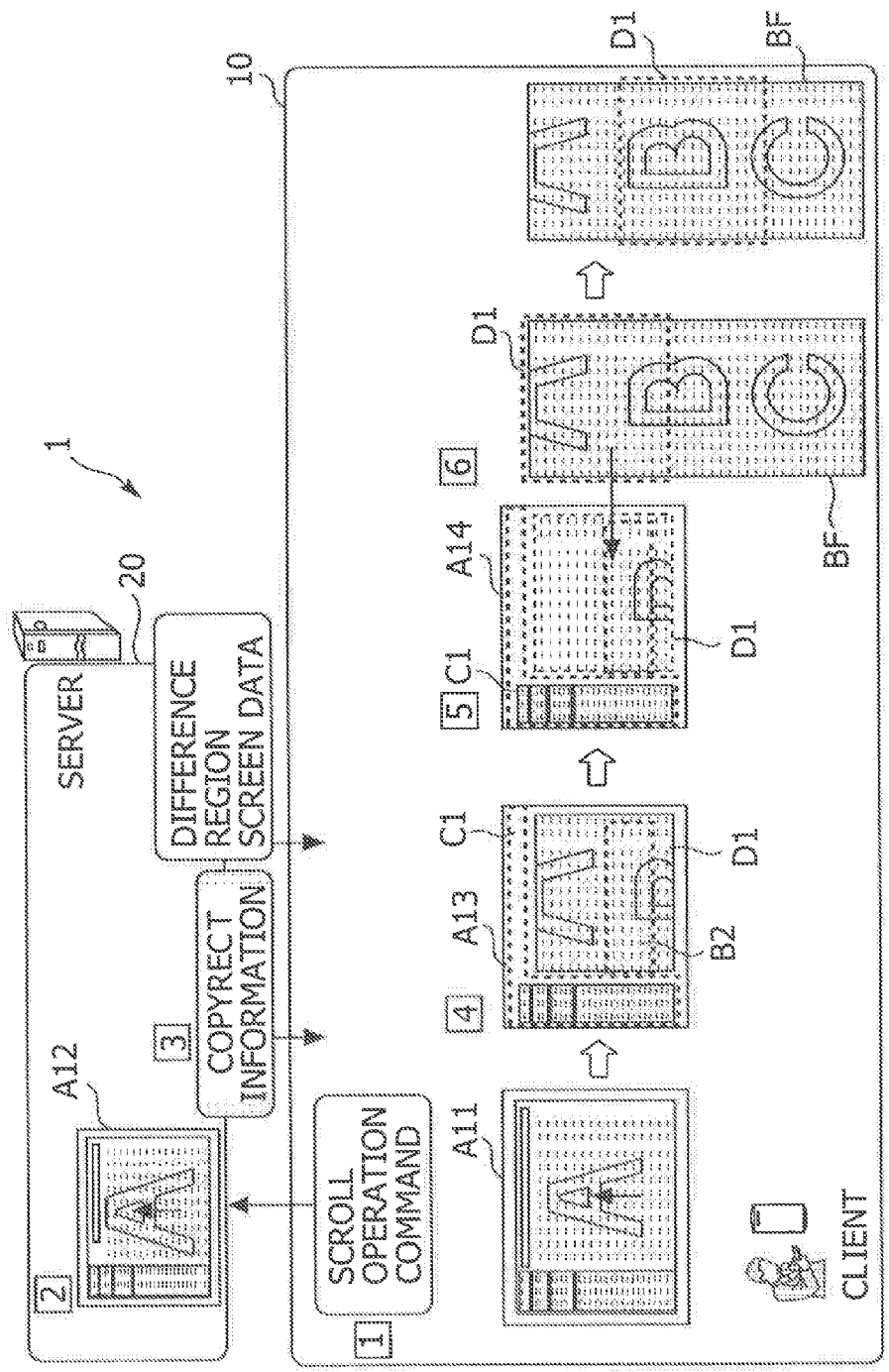

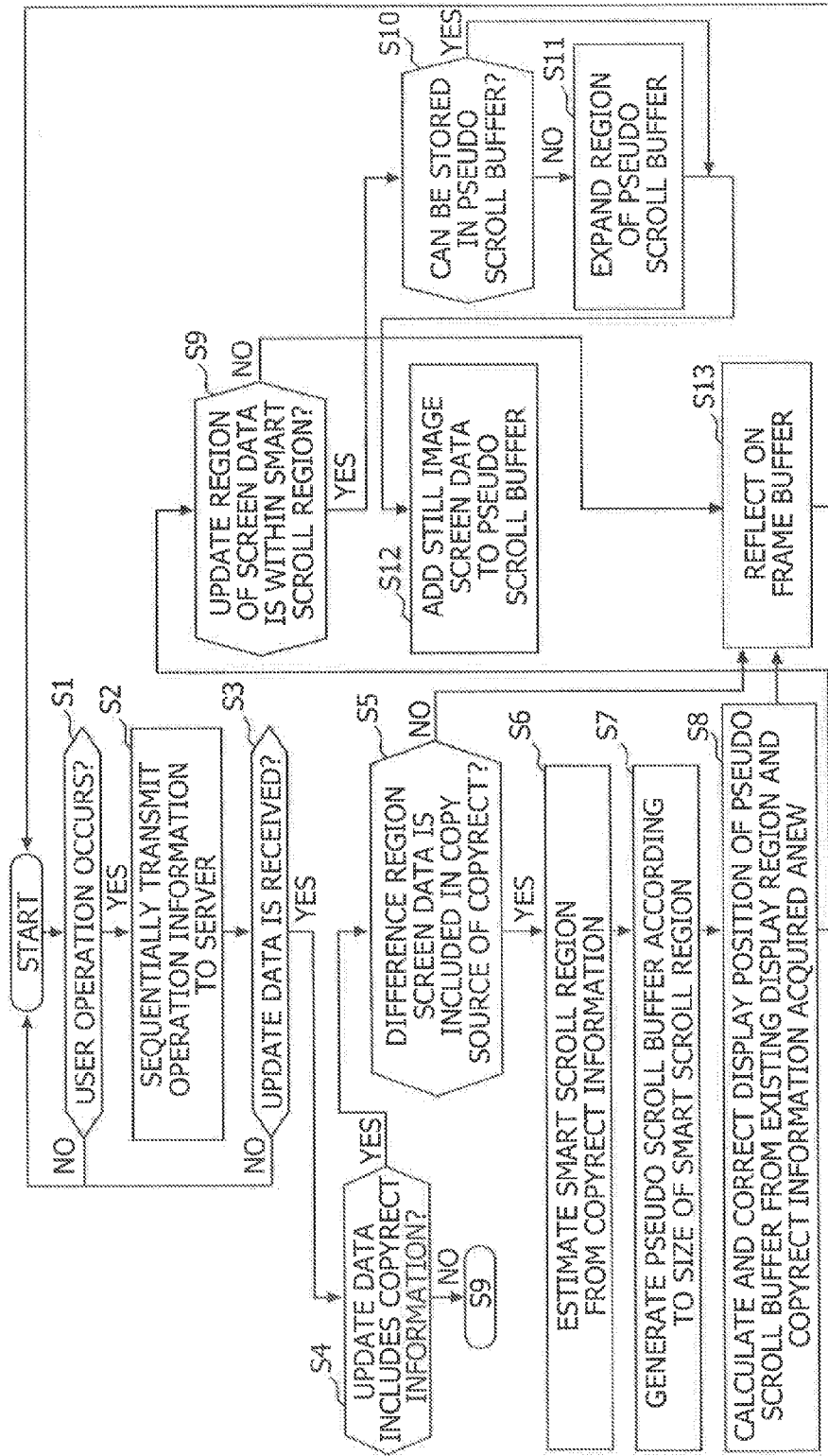

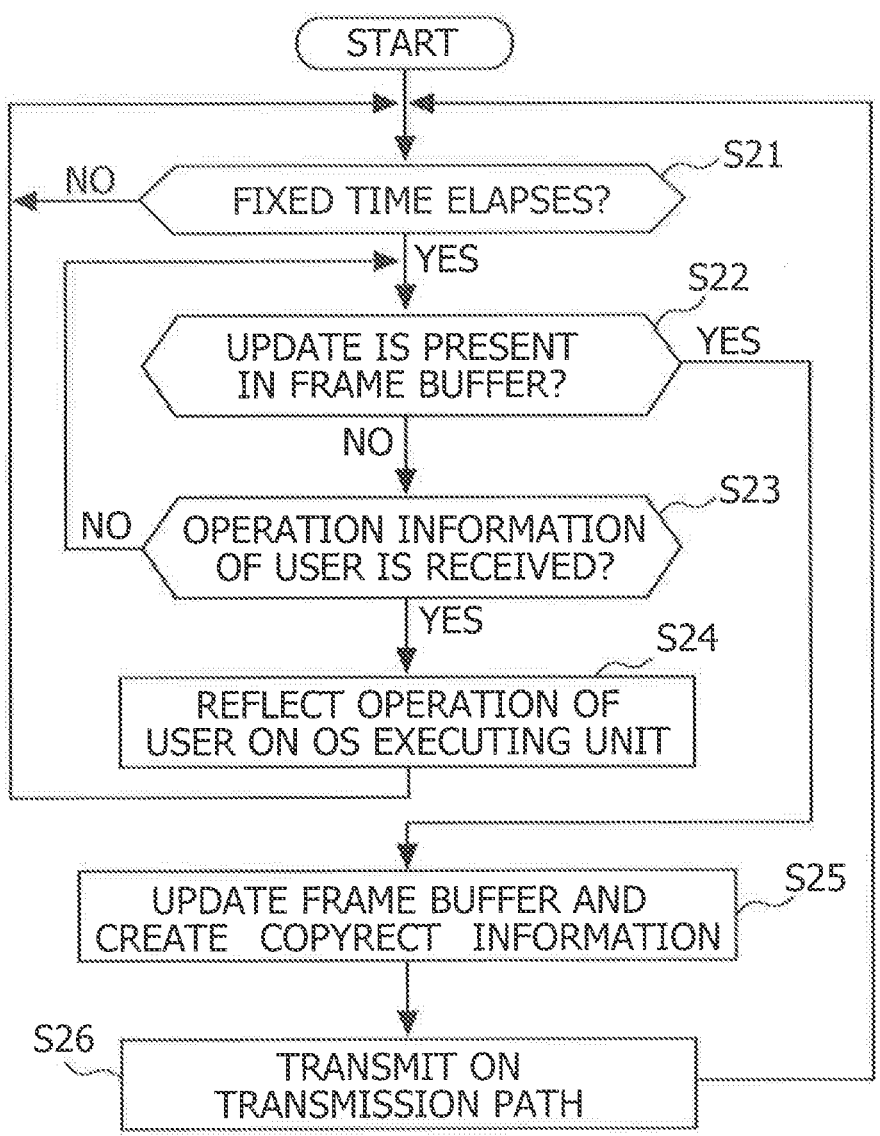

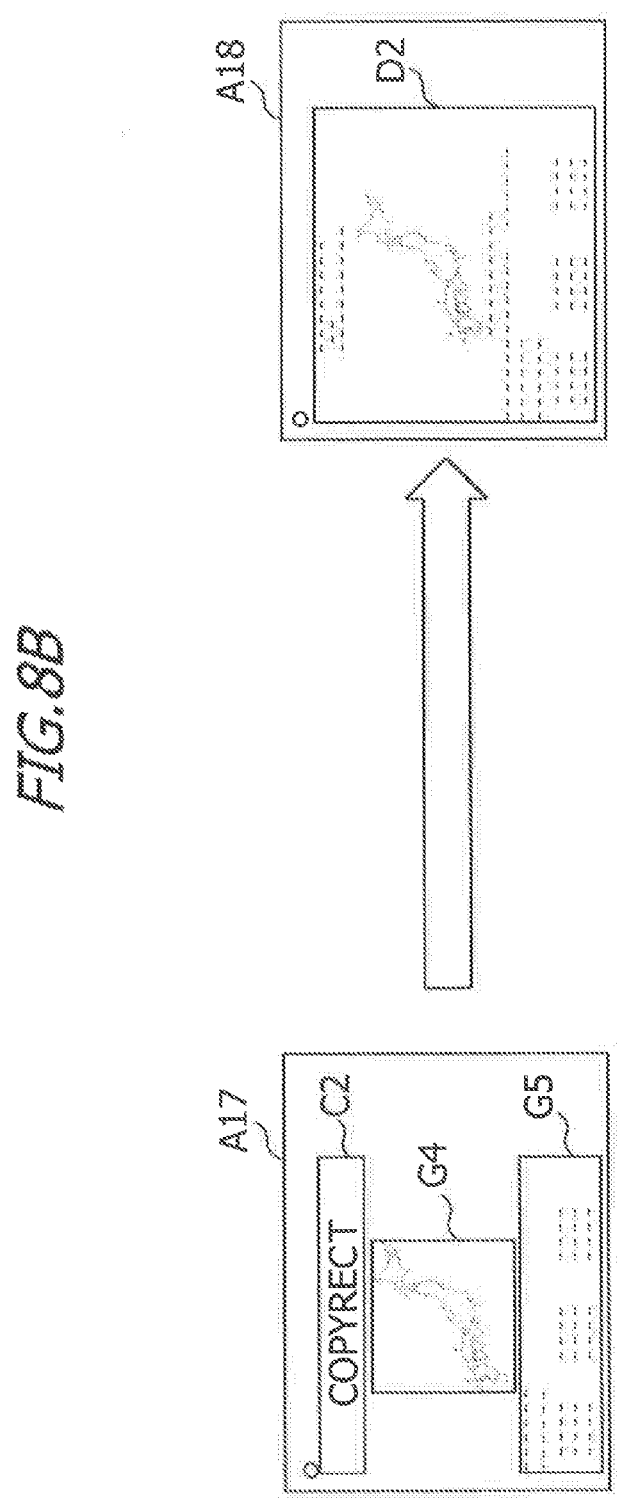

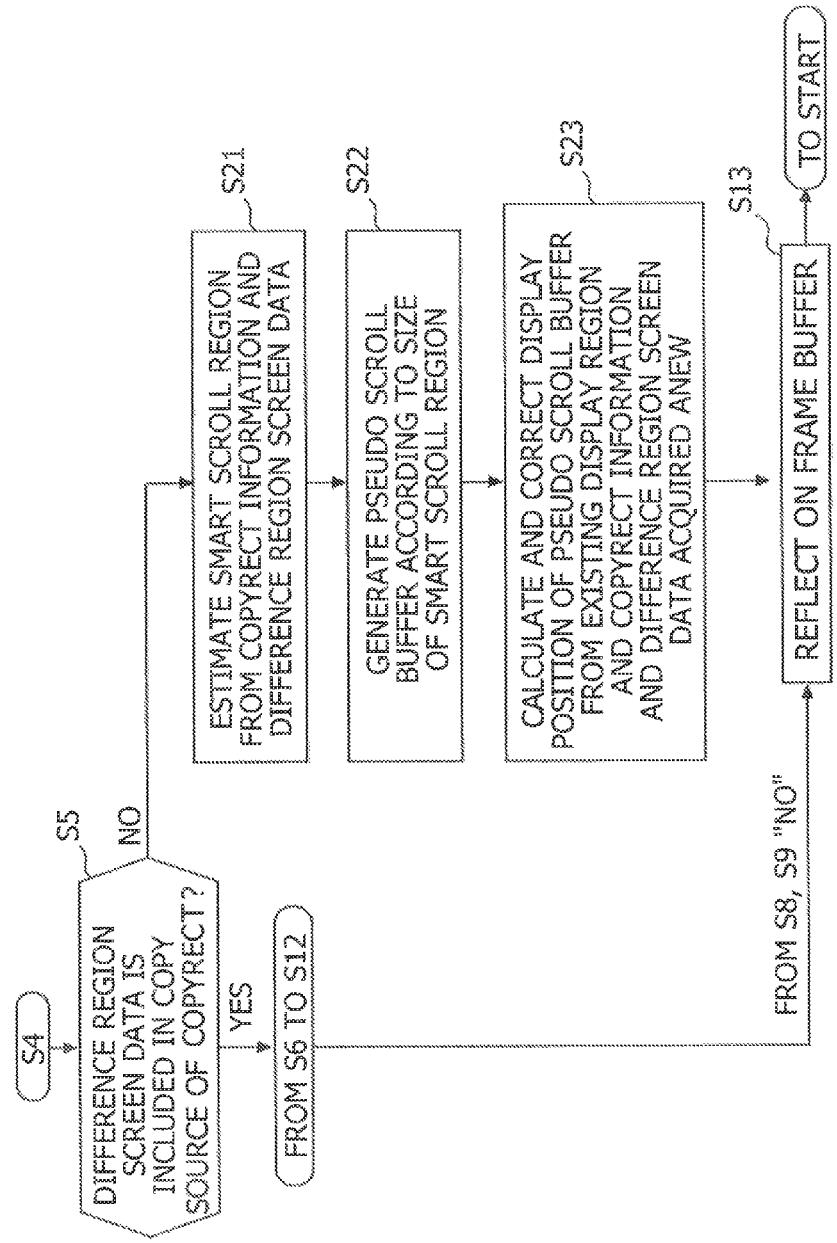

TERMINAL APPARATUS AND SCREEN UPDATING METHOD

CROSS-REFERENCE TO RELATED APPLICATION

This application is based upon and claims the benefit of prior Japanese Patent Application No. 2015-27609 filed on Feb. 16, 2015, the entire contents of which are incorporated herein by reference.

FIELD

An embodiment described herein relates to a terminal apparatus, a screen updating program, a screen updating method, and an information processing system.

BACKGROUND

In recent years, according to the spread of information processing terminals such as a smart phone, a notebook PC (Personal Computer), a tablet PC, and a PDA (Personal Data Assistance) and an increase in speed in a mobile communication environment, business uses of the information processing terminals under a mobile environment are spreading. For measures against information leakage and the like during a loss of an information processing terminal carried out to the outside of a company, a thin client system that does not store, on an information processing terminal side, job data and the like stored on a server side attracts attention.

In the thin client system, an information processing terminal used by a user of the system (hereinafter referred to as user as well) and a computer such as a PC (Personal Computer) or a server provided in a remote location or the like are connected via a network. The computer such as the server transfers, for example, screen data (rendering information) of display screens of an OS (Operating System), application software, and the like displayed on the computer in operation to the information processing terminal (referred to as client terminal as well) used by the user. The client terminal receives the screen data of the display screens of the OS and the like transferred from the server or the like and displays the received screen data on a display device of the client terminal. In the client terminal, the display screens of the OS and the like displayed on the server or the like in operation are displayed in a display region of the display device. In the client terminal, user operation is performed for the screen data displayed on the display device.

The client terminal receives, for example, via a touch panel, a keyboard, or the like, an input of the user operation for the screen data displayed on the display device and transmits received operation information to the computer such as the server connected to the network. The computer such as the server reflects the operation information transmitted from the client terminal on the OS and the like in operation and transfers the screen data of the display screens updated with the operation information reflected thereon to the client terminal again.

In the client terminal, the server, and the like of the thin client system, the processing procedure explained above is repeatedly executed via the network. As a result, the client terminal of the thin client system is capable of operating various kinds of software implemented in the server or the like provided in the remote location or the like. The user of the client terminal can use an information processing function included in the server or the like by performing an operation input on the basis of the screen data transferred from the server and displayed on the display device. The user of the client terminal is capable of using various kinds of application software (hereinafter referred to as applications as well) such as job support software and a browser implemented in the server or the like.

[Patent document 1] Japanese Laid-open Patent Publication No. 2012-79222

[Patent document 2] Japanese Laid-open Patent Publication No. 2013-130967

SUMMARY

According to an aspect of the embodiment, a terminal apparatus includes: a buffer memory that stores rendering data displayed on a display device; and a processor that acquires, according to scroll operation of the display device, rendering data including a connection portion, which is connected to a residual portion displayed in a moving destination region on a screen after the scroll operation from a screen before the scroll operation and is displayed, stores, in the buffer memory for storing the rendering data including the moving destination region and the connection portion, the rendering data of the residual portion and the rendering data including the connection portion, and outputs, according to the scroll operation, in response to update of a display position of the rendering data stored in the buffer memory, the rendering data, the display position of which is updated, to the display device after the scroll operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2B is an explanatory diagram for explaining scroll operation of a comparative example in which a buffer for display processing is provided;

FIG. 6 is an explanatory diagram for explaining update processing of screen information during occurrence of the scroll operation;

FIG. 7A is a flowchart illustrating processing related to updated screen display in the scroll operation or the like of the thin client system of the embodiment;

FIG. 7B is a flowchart illustrating processing related to the updated screen display in the scroll operation or the like of the thin client system of the embodiment;

FIG. 8B is an explanatory diagram for explaining the estimation processing for the smart scroll region of the modification; and FIG. 8C is a flowchart illustrating processing related to updated screen display reflecting the estimation processing for the smart scroll region of the modification.

DESCRIPTION OF EMBODIMENT

Figure 1:
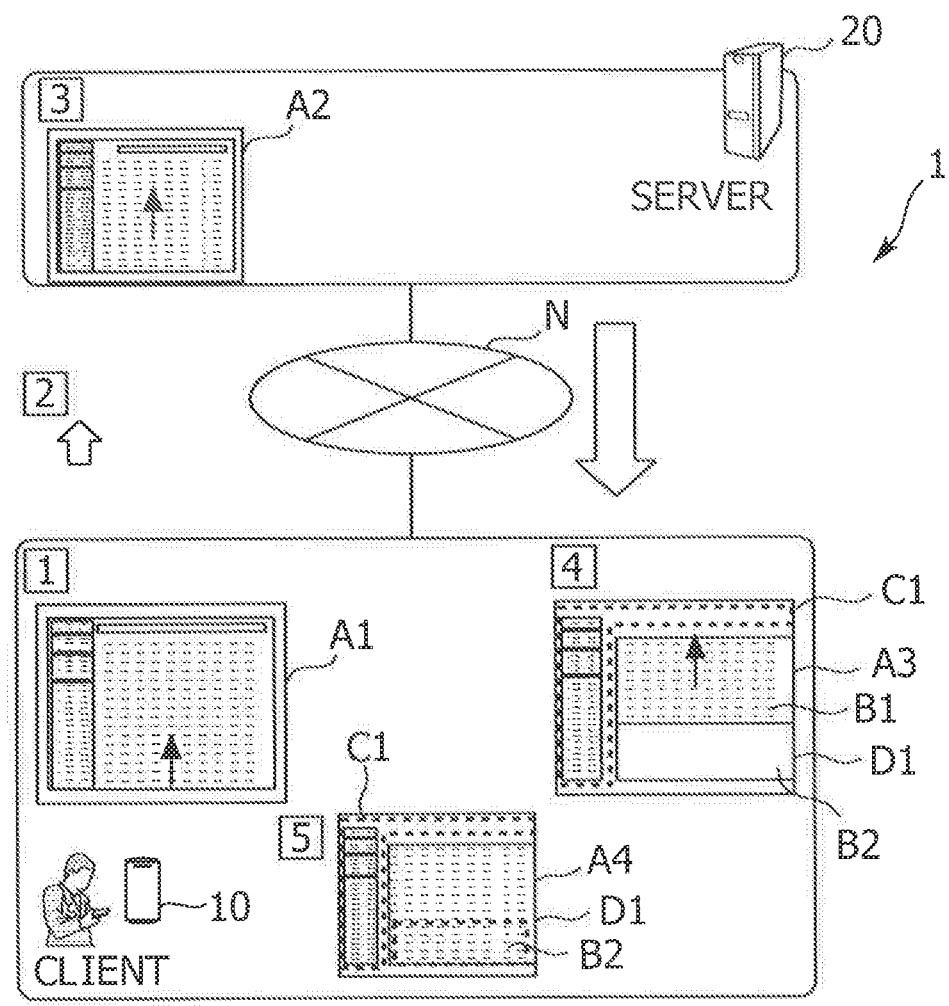
FIG. 1 is an explanatory diagram for explaining a thin client system of an embodiment.

It is assumed that, for example, in the thin client system, the user of the client terminal starts, for example, a browser application implemented in the server or the like and browses contents such as a Web page. When the contents such as the Web page being browsed do not fit in the display region of the display device, in the client terminal, scroll operation or the like for browsing a partial region not displayed on a display screen being browsed occurs.

When the scroll operation occurs, the client terminal transmits operation information to the server or the like and receives the screen data updated with the operation information reflected thereon from the server or the like. The scroll operation has a characteristic that, since most or all of scroll target regions move in one operation, a large volume of screen regions are changed irrespective of whether an operation amount is large or small. In the client terminal, the display screen displayed on the display device is updated on the basis of the screen data updated with the operation information reflected thereon. The display screen displayed on the display device of the client terminal is collectively updated in every scroll operation. Because of this characteristic, when the scroll operation or the like occurs, a data transfer amount concerning an updated screen increases between the client terminal and the server or the like of the thin client system.

In order to reduce the data transfer amount concerning the updated screen between the client terminal and the server or the like, it is conceivable to use screen data already transferred to the client terminal side. For example, it is conceivable that the client terminal copies a partial region, a display region of which moves, out of the already-transferred screen data and reflects the partial region on the screen data after the update. However, in the client terminal, copy processing of the partial region, the display region of which moves, occurs for the already-transferred screen data. Therefore, a processing load related to the screen data display after the update tends to be high.

For example, it is conceivable to extend rendering information of the Web page being browsed until scrolling becomes unnecessary and give the extended screen data to a buffer for display processing of the client terminal. The client terminal changes, according to the scroll operation, a readout position (a display position) of partial data displayed on the display device in the screen data stored in the buffer for display processing. Consequently, the update of the display screen can be expected.

However, the screen data stored in the buffer for display processing of the client terminal is the extended rendering information of the Web page being browsed. Therefore, it is likely that inappropriate rendering such as a position shift of the display information occurs.

A terminal apparatus (a client side terminal) of a thin client system according to an embodiment is explained below with reference to the drawings. A configuration of the embodiment explained below is illustration. The terminal apparatus of the thin client system is not limited to the configuration of the embodiment.

The terminal apparatus of the thin client system is explained below with reference to the drawings of FIGS. 1 to 8.

An explanatory diagram of a thin client system 1 of this embodiment is illustrated in FIG. 1. The thin client system 1 illustrated in FIG. 1 includes, for example, a terminal apparatus 10 and a server 20 connected to a network N such as the Internet, which is a public network. The network N includes, for example, a wireless network such as a cellular phone network and a LAN (Local Area Network). For example, a plurality of the terminal apparatuses 10 and a plurality of the servers 20 can be connected to the network N.

In the thin client system 1 illustrated in FIG. 1, the server 20 is, for example, an information processing apparatus such as a PC (Personal Computer) having a communication function for connecting the server 20 to the network N. For example, an OS (operating system) and various programs are implemented in the server 20. The various programs include various kinds of application software (hereinafter referred to as applications as well) such as job support software such as schedule management, a spreadsheet, and document creation and a browser.

The terminal apparatus 10 is, for example, an information processing apparatus such as a PC, a smart phone, a notebook PC, a tablet PC, or a PDA (Personal Data Assistance) having a communication function for connecting the terminal apparatus 10 to the network N. The terminal apparatus 10 includes, for example, a display device such as an LCD (Liquid Crystal Display) as an output unit. The terminal apparatus 10 includes, as an input unit, an input device such as a touch panel or a keyboard that a client of the terminal apparatus 10 (hereinafter referred to as user as well) can operate.

In the thin client system 1 illustrated in FIG. 1, the terminal apparatus 10 functions as a client side terminal used by the user of the thin client system 1. For example, rendering information transferred from the server 20 is displayed on the display device such as the LCD of the terminal apparatus 10.

The server 20 transfers, for example, screen data (rendering information) related to display screens of an OS, job support software, and a browser in operation to the terminal apparatus 10, which is the client terminal side, via the network N. The screen data transferred to the terminal apparatus 10 is temporarily stored in, for example, a buffer (buffer memory) for display processing included in the terminal apparatus 10.

In the terminal apparatus 10, for example, display processing is performed on the basis of the screen data transferred from the server 20. The display screens of the OS, the application, and the like in operation in the server 20 are displayed in a display region of the display device such as the LCD included in the terminal apparatus 10. The display screens related to the OS, the application, and the like in operation in the server 20 are displayed on the display device of the terminal apparatus 10.

The terminal apparatus 10 of the thin client system 1 receives, for example, operation information of the user input with respect to the information displayed on the display device. The terminal apparatus 10 receives, for example, the operation information of the user via the input device such as the touch panel or the keyboard. The terminal apparatus 10 transmits, for example, the received operation information to the server 20 connected to the terminal apparatus 10 via the network N.

The server 20 of the thin client system 1 receives, for example, the operation information transmitted from the terminal apparatus 10 and reflects the received operation information on the OS, the application, or the like in operation. As a result of the reflection of the operation information on the OS, the application, or the like in operation, the screen data is updated in the server 20. The updated screen data related to the display screens of the OS, the application, and the like in operation is transferred to the terminal apparatus 10 again via the network N.

In the thin client system 1 illustrated in FIG. 1, the processing procedure related to the screen data explained above is repeatedly executed between the server 20 and the terminal apparatus 10 connected to the network N. As a result, in the thin client system 1, the terminal apparatus 10 can use, on the basis of the transferred screen data, information processing functions by various kinds of software implemented in the server 20. In the terminal apparatus 10 of the thin client system 1, for example, it is possible to perform, without storing various data and the like related to job content, job uses of applications such as job support software and a browser implemented in the server 20.

For example, use by the terminal apparatus 10 of the browser application implanted in the server 20 is assumed. The server 20, in which the browser application is started, acquires contents described in the HTML (HyperText Markup Language) or the like on a connected Web. The server 20 transfers screen data related to screen display of the acquired contents to the terminal apparatus 10. On the display device of the terminal apparatus 10 that receives the screen data, contents such as a Web page acquired by the browser application of the server 20 are displayed.

When the contents acquired by the browser application of the server 20 do not fit in the display region of the display device, for example, in the terminal apparatus 10, scroll operation by the user for displaying and browsing partial information not displayed on the display device occurs.

In order to suppress a data transfer amount between the server 20 and the terminal apparatus 10 involved in the scroll operation, for example, it is assumed that the data transfer amount is reduced by using a partial region of the screen data immediately before the occurrence of the scroll operation. For example, use of "CopyRect information" for specifying a rectangular region, a display region of which moves, out of the screen data immediately before the occurrence of the scroll operation and copying partial data of the rectangular region to a designated display region in the display device after the update can be illustrated.

Comparative Example

Figure 2A:
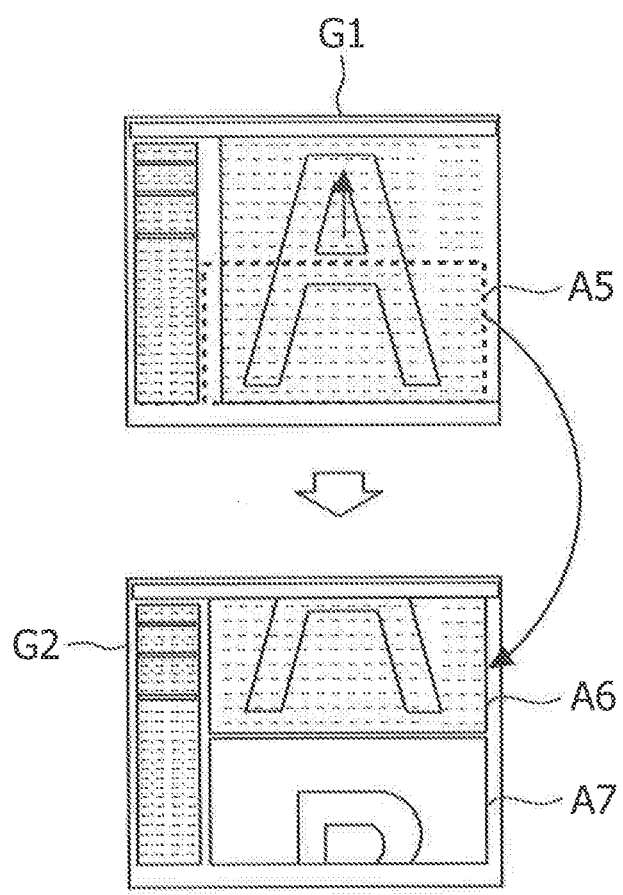
FIG. 2A is an explanatory diagram for explaining a comparative example in which a data transfer amount involved in scroll operation is reduced.

In FIG. 2A, an explanatory diagram for reducing the data transfer amount involved in the scroll operation using the "CopyRect information" serving as a comparative example is illustrated. A screen G1 illustrated in FIG. 2A is a display screen example displayed on the display device of the terminal apparatus 10 immediately before the scroll operation occurs. A screen G2 illustrated in FIG. 2A is a display screen example after the update updated using the "CopyRect information".

In the explanatory diagram of FIG. 2A, display information "A" displayed on the screen G1 represents, for example, contents such as a Web page being browsed using the browser application of the server 20. It is assumed that the display information "A" displayed on the screen G1 represents a part of the contents. Therefore, display information such as "B" and "C", which is not displayed in the display region of the display device of the terminal apparatus 10 being browsed, is present below "A" being displayed.

In the terminal apparatus 10, for example, scroll operation for browsing the display information such as "B" and "C" below the display information "A" displayed on the display screen occurs. The terminal apparatus 10 receives, for example, a scroll operation input of the user input via the input device such as the touch panel or the keyboard and transmits scroll operation information based on the received scroll operation input to the server 20.

As the scroll operation information, for example, a scroll operation command for moving the display region of the display device can be illustrated. The scroll operation information includes, for example, a moving direction, a movement amount, and the like for moving the display region of the display device. The terminal apparatus 10 transmits, for example, scroll operation information for setting a movement amount in the up-down direction to "z" to the server 20. Note that the moving direction of the display region can be added to, for example, the movement amount "z" as a sign. For example, an upward direction and a downward direction can be respectively represented by signs such as "+" and "−". Note that movement in the upward direction may be added with no sign and movement in the downward direction may be added with "−".

The server 20 transfers, for example, on the basis of the scroll operation information transmitted from the terminal apparatus 10, screen data to be displayed on the display device of the terminal apparatus 10 after the update to the terminal apparatus 10. However, the server 20 designates, in the screen data immediately before the occurrence of the scroll operation, using the "CopyRect information", region information of a partial region, a display position of which moves in the display region of the display device of the terminal apparatus 10, and position information of a copy destination to which the partial region is copied. The server 20 transfers, for example, the "CopyRect information" to the terminal apparatus 10 as the screen data after the update and transfers screen data of the other display region excluding the partial region included in the "CopyRect information" to the terminal apparatus 10.

The "CopyRect information" includes, for example, in the screen data immediately before the occurrence of the scroll operation (referred to as rendering information of a copy source as well), the region information of the partial region, the display position of which moves in the display region of the display device of the terminal apparatus 10. The "CopyRect information" includes, for example, the position information in the display device of the terminal apparatus 10 serving as the copy destination of the partial region.

The position of the display region in the display device of the terminal apparatus 10 can be represented as, for example, a two-dimensional coordinate (X, Y) in which an upper left corner portion is set as an origin, the lateral direction (the left-right direction) of the display device is represented as an X axis, and the longitudinal direction (the up-down direction) is represented as a Y axis. In the "CopyRect information", for example, the partial region of the copy source can be represented as variable information of four elements by representing a coordinate position of the upper left corner portion as "x", "y", representing the width in the left-right direction of the partial region as "w", and representing the height in the up-down direction as "h". The partial region of the copy source can be represented as a rectangular region.

In the "CopyRect information", for example, the display position of the display device of the terminal apparatus 10, to which the partial region of the rectangular region represented as the variable information of the four elements is copied, can be represented as a coordinate position "xc", "yc". Note that, for example, the coordinate position "x", "y" of the upper left corner portion of the rectangular region of the copy source is copied to match the coordinate position "xc", "yc" of the copy destination. In the "CopyRect information", as explained above, for example, the rendering information of the copy source and the position information of the copy destination can be represented as variable information of six elements (x, y, w, h, xc, yc).

Note that, in the screen G1 illustrated in FIG. 2A, a rectangular region A5 surrounded by a broken line represents, for example, in the "CopyRect information", rendering information of the rectangular region of the copy source designated as the variable information of the four elements. It is seen that the rectangular region A5 surrounded by the broken line includes a lower region of "A" being displayed.

In the terminal apparatus 10, for example, the "CopyRect information" transferred from the server 20 is reflected as the rendering information of the display screen updated by the scroll operation. The terminal apparatus 10 specifies, for example, on the basis of the "CopyRect information" transferred from the server 20, the copy region of the rectangular region, a display position of which moves, from a buffer region where the screen data immediately before the occurrence of the scroll operation is stored. The terminal apparatus 10 copies rendering information of the specified copy region of the rectangular region to the display position of the copy destination designated by the "CopyRect information".

The terminal apparatus 10 receives screen data of the other display region excluding the rectangular region designated as the copy region of the "CopyRect information". The terminal apparatus 10 performs, for example, on the basis of the received screen data of the other display region, display processing of the other display region excluding the rectangular region copied by the "CopyRect information".

In the screen G2 illustrated in FIG. 2A, a rectangular region A6 surrounded by a solid line represents a partial region copied on the basis of the "CopyRect information" transferred from the server 20. A rectangular region A7 surrounded by a solid line represents a display region displayed on the basis of the screen data of the other display region excluding the rectangular region designated by the "CopyRect information" transferred from the server 20. The rectangular region A6 includes a lower region of "A" being displayed on the screen G1. In the rectangular region A7, an upper region of display information "B" present below "A" being displayed on the screen G1 is displayed.

When data transfer of the screen data involved in the scroll operation is performed using the "CopyRect information", for example, until the scroll operation ends, the update processing of the screen data explained above is repeated between the server 20 and the terminal apparatus 10.

As explained with reference to FIG. 2A, the "CopyRect information" is the variable information of the six elements by the combination of the variable information indicating the rectangular region (the copy region) in the rendering information of the copy source and the variable information indicating the display position of the copy destination. Therefore, compared with when screen data for updating the entire display region of the display device of the terminal apparatus 10 is transferred, a reduction in a data transfer amount of the rendering information of the copy source designated by the "CopyRect information" can be expected. However, in the terminal apparatus 10, the copy processing of the rectangular region designated by the "CopyRect information" occurs from the buffer for display processing. Therefore, a processing load of processing for rendering the display screen after the update tends to increase.

Note that, for example, it is assumed that a buffer for processing having a region size capable of collectively storing rendering information of contents such as a Web page being browsed is provided in the terminal apparatus 10. The server 20 moves, for example, the contents of the Web page being browsed until the data transfer involved in the scroll becomes unnecessary and acquires screen data. The server 20 transfers rendering information including the acquired screen data to the terminal apparatus 10 as screen data. For example, the terminal apparatus 10 performs rendering processing on the basis of the rendering information transferred from the server 20 and stores the screen data in the buffer for processing. The buffer for processing includes the screen data acquired by moving the contents of the Web page being browsed until the data transfer involved in the scroll becomes unnecessary.

For example, when scroll operation occurs, the terminal apparatus 10 performs processing for changing, according to a moving direction, a display position of display on the display device of the screen data stored in the buffer for processing. The terminal apparatus 10 can perform, for example, pseudo screen scroll by shifting the display position of the display on the display device in the screen data stored in the buffer for processing (hereinafter referred to as pseudo scroll as well).

In the pseudo scroll, a scroll movement of the screen data displayed on the display device can be executed as processing on the terminal apparatus 10 side. In the pseudo scroll, display processing is performed on the basis of the screen data, which is stored in the buffer for processing, acquired by moving the contents of the Web page being browsed until the data transfer involved in the scroll becomes unnecessary. Between the server 20 and the terminal apparatus 10 in which the data transfer involved in the scroll becomes unnecessary, it is possible to reduce occurrence of the data transfer related to the screen data before and after the update involved in the scroll operation. Therefore, it is possible to suppress an increase in a data transfer amount between the server 20 and the terminal apparatus 10 involved in the scroll operation.

In FIG. 2B, an explanatory diagram of scroll operation performed when providing a buffer for processing having a size capable of storing rendering information for contents such as a Web page being browsed is illustrated as a comparative example. The terminal apparatus 10 illustrated in FIG. 2B is, for example, an example in which a tablet PC is adopted as a client terminal.

In the display region of the display device included in the terminal apparatus 10, for example, a partial region A8 in the screen data of the contents such as the Web page transferred from the server 20 is displayed. In the partial region A8, display information "A", which is a part of the contents, is displayed. In the buffer for processing of the terminal apparatus 10, as illustrated in FIG. 2B, rendering information A10 transferred from the server 20 is stored. The rendering information A10 includes screen data acquired by moving the Web page being browsed until data transfer involved in the scroll becomes unnecessary. The rendering information A10 includes "A", "B", and "C", which are display information of the contents. Note that the rectangular regions A8 and A9 surrounded by broken lines in FIG. 2B represent partial regions displayed on the display device included in the terminal apparatus 10.

The terminal apparatus 10 receives, for example, via the input device such as the touch panel, a scroll operation input of the user for moving the screen data displayed in the display region of the display device in the upward direction. The terminal apparatus 10 performs, for example, on the basis of the scroll operation input, movement of the screen data displayed on the display device.

As illustrated in FIG. 2B, the terminal apparatus 10 performs, for example, concerning the rendering information A10 stored in the buffer for processing, a change of the display position of the partial region displayed in the display region of the display device. The terminal apparatus 10 changes, for example, according to the scroll operation in the upward direction, the display position of the partial region displayed in the display region of the display device to be shifted to the downward side. In the display region of the display device of the terminal apparatus 10 after the scroll operation, the partial region A9 located on the lower side of the partial region A8 is displayed. On the display device of the terminal apparatus 10 after the scroll operation, the display information "B" present below the display information "A" is displayed. Note that, on the display device of the terminal apparatus 10, for example, a coordinate position of an upper left corner portion of the partial region A9 is displayed to be an upper left corner portion (e.g., an origin coordinate) of the display region of the display device.

However, when rendering information having the position information in the display region as a variable for contents display is present in the contents such as the Web page being browsed, unintended inappropriate rendering such as a position shift of display content of the contents is likely to occur. Rendering information of a region not moved originally by the scroll operation tends to be inappropriately displayed. For example, when the rendering information of the region not moved originally by the scroll operation is included in the contents such as the Web page, as illustrated in a partial region A101 of FIG. 2B, unnecessarily extended rendering sometimes occurs.

Embodiment

Update processing of screen data of the terminal apparatus 10 and the server 20 involved in the scroll operation of the thin client system 1 of this embodiment is explained. In this embodiment, for example, a region designated by the "CopyRect information" is referred to as "moving region".

As illustrated in "1" surrounded by a rectangular frame in FIG. 1, in the terminal apparatus 10, for example, screen data A1 of a Web page transferred from the server 20 is displayed. The screen data A1 is displayed in the display region of the display device included in the terminal apparatus 10. The screen data A1 is, for example, a partial region in rendering information of the Web page being browsed. In the terminal apparatus 10, for example, it is assumed that scroll operation of the screen data A1 occurs. The scroll operation is performed by, for example, the user browsing the screen data A1.

In the terminal apparatus 10, as illustrated in "2" surrounded by a rectangular frame in FIG. 1, the scroll operation information is transmitted to the server 20 via the network N. The scroll operation information transmitted to the server 20 is explained, for example, with reference to FIG. 2A.

As illustrated in "3" surrounded by a rectangular frame in FIG. 1, the server 20 receives the scroll operation information transmitted from the terminal apparatus 10. The received scroll operation information is reflected on, for example, a browser application in operation. For example, the browser application performs the scroll operation on the basis of the scroll operation information and updates the screen data before the scroll operation. The server 20 generates, for example, the "CopyRect information" on the basis of the updated screen data. Region information of a partial region, a display position of which moves, and position information of a moving destination, to which the partial region is moved, are designated by the "CopyRect information" in the screen data before the scroll operation. Note that the "CopyRect information" is represented by, for example, the variable information (x, y, w, h, xc, yc) of the six elements.

The server 20 generates screen update information related to the screen data after the scroll operation including, for example, the "CopyRect information". Note that the screen update information includes, for example, screen data of a screen portion appearing anew on the screen of the display device according to the scroll operation (hereinafter referred to as difference region screen data as well). The difference region screen data is, for example, rendering information, which is displayed on the display device as screen data after the scroll update, in a region other than the region designated by the "CopyRect information".

As explained above, the region designated by the "CopyRect information" is a residual portion of the screen data displayed on the display device before the scroll operation. The difference region screen data is a screen portion appearing anew on the screen of the display device according to the scroll operation. Therefore, the screen data displayed on the display device after the update includes data of the residual portion designated by the "CopyRect information" and the difference region screen data added anew on the screen of the display device in the scroll operation.

The generated screen update information is transmitted to, for example, the terminal apparatus 10 via the network N. Note that, when the "CopyRect information" is not generated, for example, the difference region screen data is transmitted to the terminal apparatus 10 from the server 20 as the screen update information. For example, as illustrated in "4" surrounded by a rectangular frame in FIG. 1, the terminal apparatus 10 performs, on the basis of the screen update information transmitted from the server 20, display processing of screen data A3 updated by the scroll operation.

For example, when a region range of the difference region screen data is included in a moving source region of a moving region designated by the "CopyRect information", the terminal apparatus 10 of this embodiment estimates a scroll region on the basis of the "CopyRect information". For example, in the screen data A3, a rectangular region B1 is obtained by moving the moving region designated by the "CopyRect information" from the moving source region to a moving destination. It is assumed that, in the screen data A3, the region range of the difference region screen data corresponds to a rectangular region B2. The rectangular region B2 is included in the region of the moving source of the rectangular region B1.

For example, it is assumed that, in the moving source region before the scroll operation, a region size of the moving region is a half or more of a region size of the moving source region. A region of a half or more of the moving source region is designated by the "CopyRect information". The region moves to the rectangular region B1, which is the moving destination region after the scroll operation. The difference region screen data is a screen portion that appears anew on the screen of the display device according to the scroll operation. That is, the difference region screen data is included in the region range of the residual region to which the moving region of the moving source region moves.

Note that the estimation of the scroll region is not performed when the region range of the difference region screen data is not included in the moving source region of the moving region designated by the "CopyRect information". The terminal apparatus 10 performs display of the screen data after the update on the basis of the screen update information received from the server 20.

In the terminal apparatus 10 of this embodiment, the scroll region, a display position of which moves according to the scroll operation in the display region of the display device, is estimated on the basis of the "CopyRect information". Note that, in the following explanation, the scroll region of the display region of the display device estimated on the basis of the "CopyRect information" is referred to as "smart scroll region" as well.

The terminal apparatus 10 of this embodiment performs, for example, on the basis of the smart scroll region, pseudo scroll display explained with reference to FIG. 2B. The terminal apparatus 10 dynamically sets, for example, in the smart scroll region estimated on the basis of the "CopyRect information", a pseudo scroll buffer for performing the pseudo scroll display.

The terminal apparatus 10 dynamically sets, for example, on the basis of the smart scroll region estimated from the "CopyRect information", a buffer region serving as the pseudo scroll buffer in a predetermined region of a RAM or the like of a main storage unit 13. In the dynamically-set pseudo scroll buffer, for example, rendering information of a region, a display position of which moves according to the scroll operation, in the screen data after the update is stored. The rendering information stored in the pseudo scroll buffer includes, for example, rendering information displayed in the smart scroll region estimated by the terminal apparatus 10 of this embodiment.

As a result, in the terminal apparatus 10 of this embodiment, it is possible to perform, on the basis of the rendering information stored in the pseudo scroll buffer, the pseudo scroll display involved in the scroll operation. In the terminal apparatus 10 of this embodiment, it is possible to perform the pseudo scroll display of the region (the smart scroll region), the display position of which moves in the display region of the display device on which the screen data after the update is displayed. For example, the terminal apparatus 10 performs, according to the scroll, changing processing for the display position in the rendering information stored in the pseudo scroll buffer and moves the display position of the screen data displayed in the smart scroll region in the display region of the display device.

In the terminal apparatus 10 of this embodiment, it is possible to perform pseudo scroll operation for the smart scroll region, the display position of which in the display region is moved by the scroll operation. Consequently, in the terminal apparatus 10 of this embodiment, it is possible to improve operability concerning the region, the display position of which moves in the display region of the display device according to the scroll operation. In the terminal apparatus 10 of this embodiment, it is possible to perform the pseudo scroll display of the smart scroll region. Therefore, it is possible to suppress a data transfer amount from the server 20 of the screen data updated in every scroll movement.

In the screen data A3 of "4" surrounded by the rectangular frame in FIG. 1, for example, a rectangular region D1 represents a smart scroll region estimated on the basis of the "CopyRect information" transmitted from the server 20. The rectangular region B1 of the screen data A3 represents screen data of a partial region displayed on the basis of the "CopyRect information". The rectangular region B1 is screen data of an existing region moved from the rendering information of the screen data A1 and a2 before the scroll operation. The rectangular region B2 corresponds to a display region where new screen data is displayed in the moving source region of the rectangular region B1.

It is seen that, in the screen data A3, the rectangular region B1 is included in the rectangular region D1. That is, in the smart scroll region estimated on the basis of the "CopyRect information", the moving region designated by the "CopyRect information" is displayed with the display position moved. The moving region designated by the "CopyRect information" is displayed, for example, with a coordinate position adjusted to an upper right corner portion of the estimated smart scroll region.

Note that a region C1 surrounded by a broken line of the screen data A3 is screen data of a partial region excluding the smart scroll region (the rectangular region D1) in the screen data before the scroll operation. The partial region represented by the region C1 surrounded by the broken line is a region, a display position of which does not move (does not change) before and after the scroll operation in the display region of the display device.

For example, the terminal apparatus 10 estimates the smart scroll region on the basis of the "CopyRect information" transmitted from the server 20. The terminal apparatus 10 specifies rendering information of the region C1 excluding the smart scroll region from the screen data of the moving source region. The terminal apparatus 10 performs, for example, on the basis of the specified rendering information of the region C1 excluding the smart scroll region, display processing of the screen data of the region C1, a display position of which does not move before and after the scroll operation. The terminal apparatus 10 performs display processing of the rectangular region D1 estimated as the smart scroll region, for example, together with the screen data of the region C1. The rectangular region D1 includes screen data of the rectangular region B1, a display position of which is moved on the basis of the "CopyRect information". On the display device of the terminal apparatus 10, for example, as illustrated in the screen data A3 in FIG. 1, the screen data of the region C1, the display position of which does not move before and after the scroll operation, and the screen data of the rectangular region B1, the display position of which moves, designated by the "CopyRect information" are displayed.

In the screen data A3 illustrated in FIG. 1, in the rectangular region D1, for example, the rendering information stored in the pseudo scroll buffer is displayed. The rendering information stored in the pseudo scroll buffer is rendering information, the display position of which moves in the display region of the display device before and after the scroll operation. For example, the terminal apparatus 10 stores, in the pseudo scroll buffer, the rendering information of the screen data of the rectangular region B1 designated by the "CopyRect information". For example, the terminal apparatus 10 specifies, on the basis of the "CopyRect information", the rendering information of the rectangular region B1 from the rendering information of the moving source and stores the rendering information in the pseudo scroll buffer.

The terminal apparatus 10 adds, for example, to the rendering information of the rectangular region B1 stored in the pseudo scroll buffer, the rendering information of the difference region screen data included in the screen update information transmitted from the server 20. The rendering information of the difference region screen data is continuously added to, for example, the bottom end of the rendering information of the rectangular region B1.

As a result, in the display region of the display device of the terminal apparatus 10, for example, as illustrated in "5" surrounded by a rectangular frame in FIG. 1, screen data A4 based on the screen update information stored in the pseudo scroll buffer is displayed. In the screen data A4, the difference region screen data continuously added to the bottom end of the rendering information of the rectangular region B1 of the pseudo scroll buffer is displayed in the rectangular region B2. In the rectangular region B2 surrounded by a broken line of the screen data A4, for example, the difference region screen data transmitted from the server 20 is displayed. The terminal apparatus 10 displays, in the rectangular region B2, screen data subjected to display processing on the basis of the rendering information of the difference region screen data.

Note that, in the screen data A4 of the terminal apparatus 10, for example, the screen data of the rectangular region B2 may be displayed on the display device after the display processing of the rendering information designated by the "CopyRect information". For example, the screen data of the rectangular region B2 may be displayed together with the screen data of the region C1, the display position of which does not move in the display region of the display device of the terminal apparatus 10, after the rendering information designated by the "CopyRect information" is displayed. More specifically, for example, as illustrated in the screen data A3, the terminal apparatus 10 displays the screen data A3 in a state in which screen data is not displayed in the rectangular region B2. The terminal apparatus 10 may transition to display the screen data A4 including the screen data corresponding to the rectangular region B2 after the display of the screen data A3. The user of the terminal apparatus 10 can check, for example, on the basis of the transition of the screen data displayed on the display device, display information updated by the scroll operation.

The terminal apparatus 10 may display the screen data A4 as screen data after the scroll operation not through the screen data A3. Since the screen data A4 is displayed not through the screen data A3, it is possible to improve a processing response of screen update processing involved in the scroll operation.

The terminal apparatus 10 can cope with processing in the case of scrolling in the downward direction in the same manner. However, in the case of the downward direction, the display region of the existing portion designated by the "CopyRect information" is displayed in, for example, a lower end region of the rectangular region D1. The rectangular region B2 is displayed in, for example, an upper end region of the rectangular region D1. In the rectangular region B2, screen data displayed anew of screen data after scroll operation in the downward direction is displayed.

Note that the rendering information stored in the pseudo scroll buffer dynamically set in a predetermined region of the RAM or the like of the main storage unit 13 of the terminal apparatus 10 is updated at any time. For example, the server 20 transmits update information involved in scroll movement to the terminal apparatus 10 at a predetermined cycle set in advance. For example, the terminal apparatus 10 temporarily stores update information transmitted from the server 20 in a predetermined region of the RAM or the like of the main storage unit 13. For example, the terminal apparatus 10 reads out the update information stored in the RAM or the like at any time and adds the update information to the rendering information stored in the pseudo scroll buffer. On the display device of the terminal apparatus 10, for example, the update information is displayed at any time according to the movement of the smart scroll region.

For example, after the setting of the pseudo scroll buffer, the terminal apparatus 10 may transmit the scroll operation information, which is transmitted in the processing of "2" surrounded by the rectangular frame, to the server 20 again. In the server 20, the difference region screen data involved in the scroll movement of the display screen is generated on the basis of the scroll operation information transmitted after the setting of the pseudo scroll buffer and is transferred to the terminal apparatus 10. The terminal apparatus 10 additionally reflects, for example, on the basis of the difference region screen data transferred from the server 20, the update information on the rendering information in the pseudo scroll buffer.

In the thin client system 1 of this embodiment, it is possible to suppress an increase in a data transfer amount and an increase in a processing load in the scroll operation and perform appropriate rendering of screen information related to update.

[Apparatus Configuration]
(Terminal Apparatus)

Figure 3:
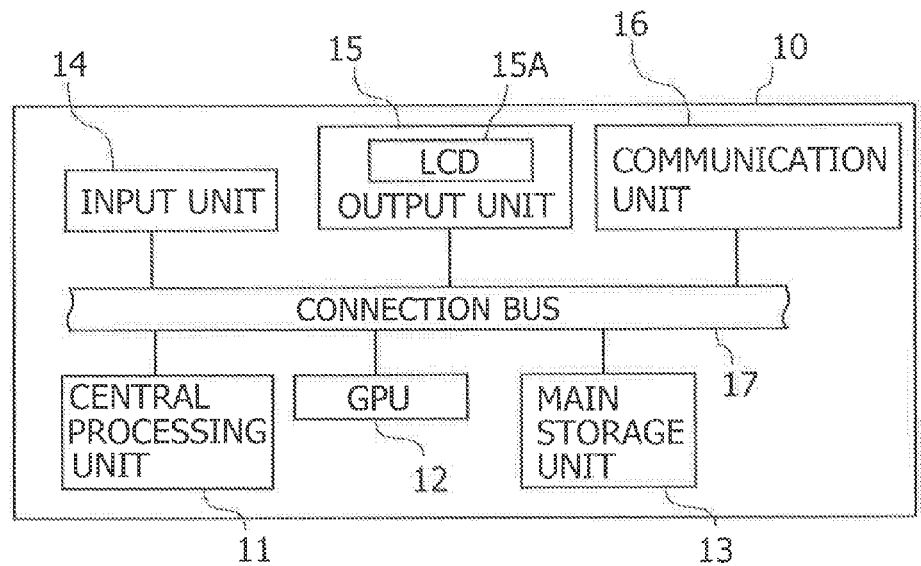
FIG. 3 is a diagram illustrating a hardware configuration example of a terminal apparatus.

The hardware configuration of the terminal apparatus 10 is illustrated in FIG. 3. The terminal apparatus 10 illustrated in FIG. 3 includes a CPU (Central Processing Unit) 11, a GPU (Graphics Processing Unit) 12, and a main storage unit 13 connected to one another by a connection bus 17. The terminal apparatus 10 includes an input unit 14, an output unit 15, and a communication unit 16 connected to the connection bus 17. The main storage unit 13 is a recording medium readable by the terminal apparatus 10. The main storage unit 13 includes, for example, a RAM (Random Access Memory) and a ROM (Read Only Memory).

In the terminal apparatus 10, the CPU 11 develops a program, which is stored in the ROM or the like of the main storage unit 13, in a work area of the RAM or the like of the main storage unit 13 to be executable and performs control of a peripheral apparatus through execution of the program. Consequently, the terminal apparatus 10 can provide a function matching a predetermined purpose.

In the terminal apparatus 10, the CPU 11 is a central processing unit that performs control of the entire terminal apparatus 10. For example, the CPU 11 performs processing according to the program stored in the ROM or the like of the main storage unit 13. The GPU 12 is a processor that mainly performs display processing of screen data displayed in the display region of the display device. Since the terminal apparatus 10 includes the GPU 12, for example, a processing load on the CPU 11 related to the display processing is reduced. It is possible to expect an increase in the speed of the display processing.

The RAM or the like of the main storage unit 13 is a storage medium in which the CPU 11 caches a program and data and develops a work area. The ROM or the like of the main storage unit 13 is a nonvolatile semiconductor memory. In the ROM or the like of the main storage unit 13, various kinds of programs and the like including a communication interface program for performing exchange of data with the server 20 and the like connected via the communication unit 16 are stored.

The input unit 14 receives an operation instruction and the like from the user and the like. The input unit 14 is an input device such as input buttons, a keyboard, a pointing device, a wireless remote controller, a microphone, or a camera. Information input from the input unit 14 is notified to the CPU 11 via the connection bus 17.

The output unit 15 outputs data to be processed by the CPU 11 and data stored in the main storage unit 13. The output unit 15 is an output device such as a CRT (Cathode Ray Tube) display, an LCD (Liquid Crystal Display) 15A, a PDP (Plasma Display Panel), an EL (Electroluminescence) panel, an organic EL panel, a printer, or a speaker. The communication unit 16 is, for example, an interface with the network N and the like.

Figure 5:
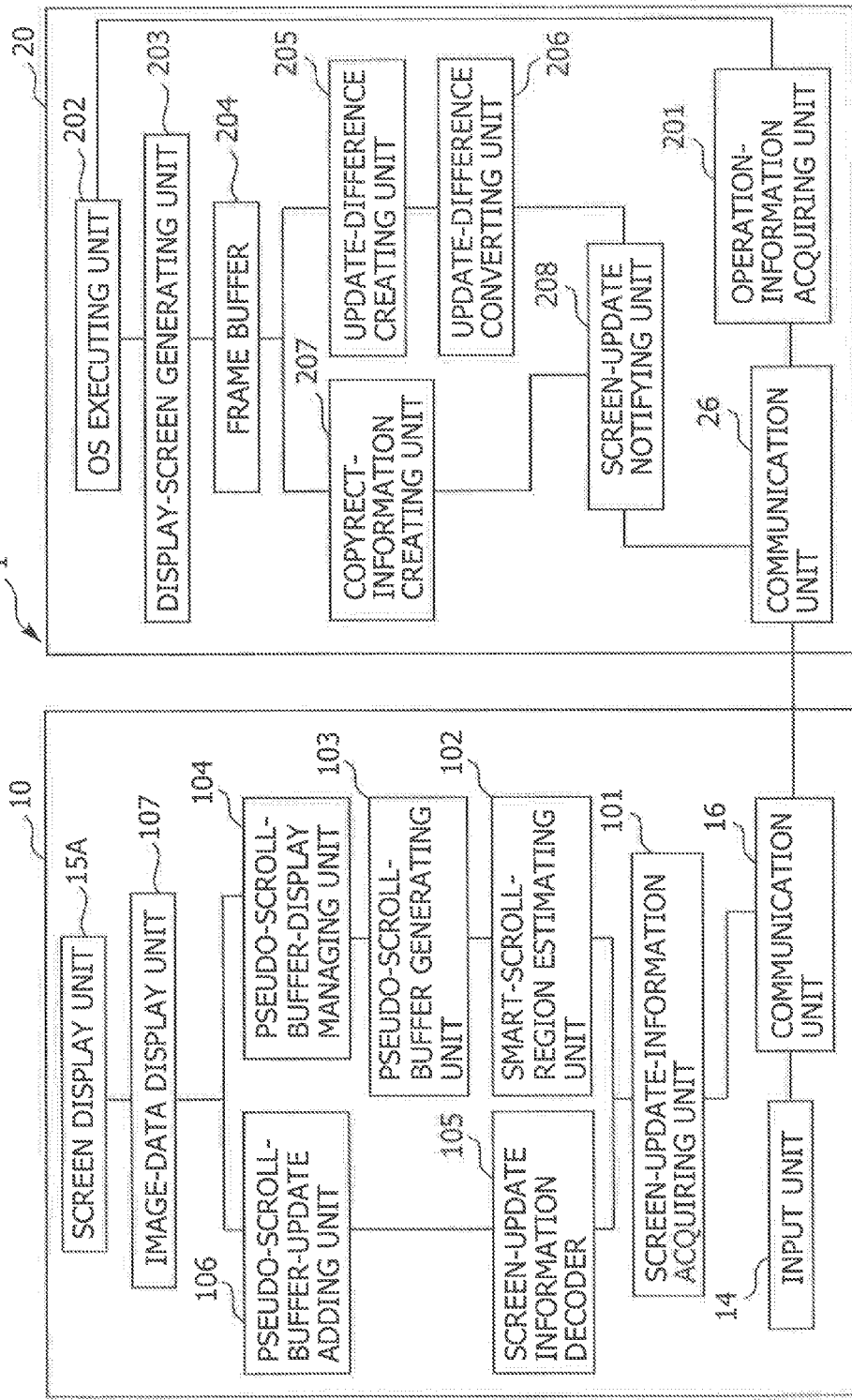
FIG. 5 is an explanatory diagram for explaining processing blocks of the thin client system of the embodiment.

In the terminal apparatus 10, for example, the CPU 11 reads out various programs and various data stored in the ROM or the like of the main storage unit 13 to the RAM or the like and executes the various programs and the various data to thereby provide processing means illustrated in FIG. 5 simultaneously with execution of a target program.

The terminal apparatus 10 provides a screen-update-information acquiring unit 101, a smart-scroll-region estimating unit 102, a pseudo-scroll-buffer generating unit 103, and a pseudo-scroll-buffer-display managing unit 104 illustrated in FIG. 5 simultaneously with the execution of the target program. The terminal apparatus 10 provides a screen update information decoder 105, a pseudo-scroll-buffer-update adding unit 106, and an image-data display unit 107 illustrated in FIG. 5 simultaneously with the execution of the target program. However, any one or a part of the processing means illustrated in FIG. 5 may operate with a hardware circuit.

(Server)

Figure 4:
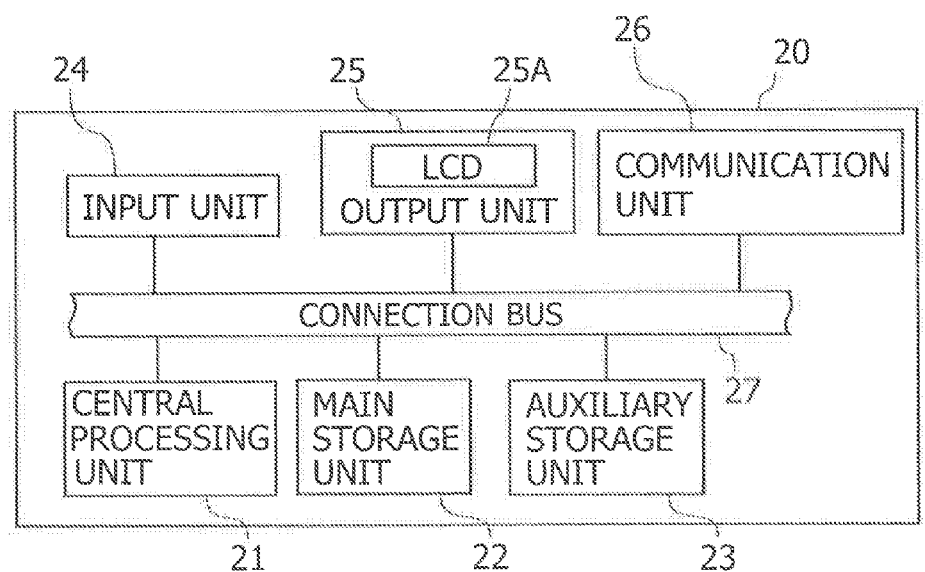
FIG. 4 is a diagram illustrating a hardware configuration example of a server.

The hardware configuration of the server 20 is illustrated in FIG. 4. The server 20 illustrated in FIG. 4 includes the configuration of a so-called general computer. The server 20 includes a CPU (Central Processing Unit) 21, a main storage unit 22, an auxiliary storage unit 23, an input unit 24, an output unit 25, and a communication unit 26 connected to one another by the connection bus 27. The main storage unit 22 and the auxiliary storage unit 23 are recording media readable by the server 20.

In the server 20, the CPU 21 develops a program, which is stored in the auxiliary storage unit 23, in a work area of the main storage unit 22 to be executable and performs control of peripheral apparatuses through execution of the program. Consequently, the server 20 can provide a function matching a predetermined purpose.

The CPU 21 is a central processing unit that performs control of the entire server 20. The CPU 21 performs processing according to a program stored in the auxiliary storage unit 23. The main storage unit 22 is a storage medium in which the CPU 21 caches a program and data and develops a work area. The main storage unit 22 includes, for example, a RAM (Random Access Memory) and a ROM (Read Only Memory).

The auxiliary storage unit 23 readably and writably stores various programs and various data in a recording medium. The auxiliary storage unit 23 is called external storage device as well. An OS, various programs, various tables, and the like are stored in the auxiliary storage unit 23. The OS provides, for example, an implemented application with an interface to resources managed by the OS. The application implemented in the server 20 provides an application function by using the interface to the resources provided by the OS. The OS includes a communication interface program that performs exchange of data with the terminal apparatus 10, an external apparatus, and the like connected via the communication unit 26. The external apparatus and the like include, for example, other information processing apparatuses such as a PC and a server and an external storage device on the network N.

The auxiliary storage unit 23 is, for example, an EPROM (Erasable Programmable ROM), a solid-state drive device, or a hard disk drive (HDD) device. As the auxiliary storage unit 23, for example, a CD drive device, a DVD drive device, and a BD drive device can be presented. As the recording medium, there are, for example, a silicon disk including a nonvolatile semiconductor memory (a flash memory), a hard disk, a CD, a DVD, a BD, a USB (Universal Serial bus) memory, and a memory card.

The input unit 24 receives an operation instruction and the like from an operator and the like. The input unit 24 is an input device such as input buttons, a pointing device such as a mouse, or a microphone. The input unit 24 may include a keyboard, a wireless remote controller, and the like. Information input from the input unit 24 is notified to the CPU 21 via the connection bus 27.

The output unit 25 outputs data to be processed by the CPU 21 and data to be stored in the main storage unit 22. The output unit 25 includes a display device such as an LCD 25A, a CRT (Cathode Ray Tube) display, a PDP (Plasma Display Panel), an EL (Electroluminescence) panel, or an organic EL panel. The output unit 25 includes an output device such as a printer or a speaker. The communication unit 26 is, for example, an interface with the network N to which the server 20 is connected.

In the server 20, the CPU 21 reads out the OS, the various programs, and the various data stored in the auxiliary storage unit 23 to the main storage unit 22 and executes the OS, the various programs, and the various data to thereby provide processing means illustrated in FIG. 5 simultaneously with execution of a target program. According to the execution of the target program, the server 20 provides an operation-information acquiring unit 201, an OS executing unit 202, a display-screen generating unit 203, a frame buffer 204, an update-difference creating unit 205, an update-difference converting unit 206, and a CopyRect-information creating unit 207 illustrated in FIG. 5. According to the execution of the target program, the server 20 provides a screen-update notifying unit 208 illustrated in FIG. 5. However, any one or a part of the processing means illustrated in FIG. 5 may operate with a hardware circuit. The server 20 includes the auxiliary storage unit 23 as a storage destination of data referred to or managed by the above processing means.

[Processing Block Configuration]

An explanatory diagram of processing blocks in the thin client system 1 of this embodiment is illustrated in FIG. 5. In the explanatory diagram illustrated in FIG. 5, the terminal apparatus 10 includes the processing means of the screen-update-information acquiring unit 101, the smart-scroll-region estimating unit 102, the pseudo-scroll-buffer generating unit 103, and the pseudo-scroll-buffer-display managing unit 104. The terminal apparatus 10 includes the processing means of the screen update information decoder 105, the pseudo-scroll-buffer-update adding unit 106, and the image-data display unit 107. Note that the terminal apparatus 10 includes, for example, the RAM or the like of the main storage unit 13 as a storage destination of data referred to or managed by the processing means.

In the explanatory diagram illustrated in FIG. 5, the server 20 includes the processing means of the operation-information acquiring unit 201, the OS executing unit 202, the display-screen generating unit 203, the frame buffer 204, the update-difference creating unit 205, the update-difference converting unit 206, and the CopyRect-information creating unit 207. The server 20 includes the processing means of the screen-update notifying unit 208. The server 20 includes, for example, the auxiliary storage unit 23 as a storage destination of data referred to or managed by the above processing means.

The processing blocks of the terminal apparatus 10 and the server 20 of this embodiment are explained below with reference to, as appropriate, an explanatory diagram of update processing of screen information during scroll operation occurrence in the thin client system 1 illustrated in FIG. 6. Note that, in the explanatory diagram of FIG. 6, as illustrated in "1" surrounded by a rectangular frame, it is assumed that, for example, screen data A11 of a Web page or the like transferred from the server 20 is displayed in the display region of the display device such as the LCD 15A of the terminal apparatus 10.

The screen data A11 is, for example, information concerning a partial region in a Web page being browsed and is rendering information that can be displayed according to a size of the display device such as the LCD 15A included in the terminal apparatus 10. Display information "A" displayed in the screen data A11 represents, for example, contents such as the Web page being browsed using a browser application of the server 20. It is assumed that the display information "A" displayed in the screen data A11 represents a part of contents. Display information such as "B" and "C", which is not displayed in the display region of the display device of the terminal apparatus 10 being browsed, is present below "A" being displayed.

As illustrated in "2" surrounded by a rectangular frame in FIG. 6, it may be assumed that, for example, the screen data A12 of the Web page or the like being browsed acquired by the browser application is displayed on the display device such as the LCD 25A included in the server 20. Note that the browser application implemented in the server 20 is started, for example, on the basis of user operation of the terminal apparatus 10. Concerning the screen data A12, information same as the information of the screen data A11 is displayed.

It is assumed that, in the terminal apparatus 10, for example, scroll operation concerning the screen data A11 by a browsing user occurs. In the explanatory diagram illustrated in FIG. 5, the screen display unit of the terminal apparatus 10 represents, for example, the display device such as the LCD 15A. The operation-information acquiring unit 201 of the terminal apparatus 10 represents, for example, the pointing device such as the touch panel included in the input unit 14. The terminal apparatus 10 transmits, for example, scroll operation information concerning the screen data A11 received via the input unit 14 to the server 20 connected to the network N. The scroll operation information concerning the screen data A11 is transmitted to, for example, the server 20 via the communication unit 16. The browser application implemented in the server 20 performs communication with a HTTP (Hypertext Transfer Protocol) server that executes an external Web server program according to, for example, a HTTP. The HTTP server transmits, according to the Web server program, in response to a request of the browser application implemented in the server 20, contents such as a Web page to the browser application. The browser application performs rendering of the received contents. However, the communication between the HTTP server and the browser application implemented in the server 20 is not limited to the HTTP.

(Server)

In the explanatory diagram illustrated in FIG. 5, the operation-information acquiring unit 201 of the server 20 receives, via the communication unit 26, for example, the scroll operation information transmitted from the terminal apparatus 10. The scroll operation information transmitted from the terminal apparatus 10 includes, for example, a moving direction and a movement amount for moving display information displayed in the display region of the LCD 15A or the like of the terminal apparatus 10.

The operation-information acquiring unit 201 temporarily stores, for example, the scroll operation information of the terminal apparatus 10 received via the communication unit 26 in a predetermined region of the main storage unit 22. The operation-information acquiring unit 201 passes the received scroll operation information of the terminal apparatus 10 to the OS executing unit 202.

The OS executing unit 202 passes, for example, the scroll operation information passed from the operation-information acquiring unit 201 to a browser application in operation related to screen display of a Web page or the like being browsed by the user of the terminal apparatus 10. The browser application in operation reflects, for example, the passed scroll operation information on the Web page or the like being browsed. As a result of the reflection of the scroll operation information, display information not displayed in the screen data A11 and A12 is acquired. The display information of the Web page or the like acquired by the browser application is passed to the display-screen generating unit 203, for example, via the OS executing unit 202.

The display-screen generating unit 203 updates, for example, on the basis of the passed display information, the rendering information stored in the frame buffer 204. Note that, in the frame buffer 204 before the update, for example, the rendering information of the screen data A12 illustrated in "2" surrounded by the rectangular frame in FIG. 6 is stored. The screen data A12 displayed in the display region of the server 20 is updated, for example, on the basis of the rendering information stored in the frame buffer 204.

In the explanatory diagram illustrated in FIG. 5, in the server 20, CopyRect information and difference region screen data are generated simultaneously with the update of the frame buffer 204. In the CopyRect information, for example, in screen data immediately before occurrence of scroll operation (rendering information of a moving source), region information of a partial region, a display position of which moves in the display region of the display device of the terminal apparatus 10, is included. In the CopyRect information, for example, position information of a moving destination to which the region information of the partial region, the display position of which moves in the display region of the display device of the terminal apparatus 10, moves is included.

The CopyRect-information creating unit 207 represents, for example, the partial region in the rendering region of the copy source as variable information of four elements of a rectangular region in which a coordinate position of the upper left corner portion is represented as "x", "y", the width in the left-right direction of the partial region is represented as "w", and the height in the up-down direction is represented as "h". The CopyRect-information creating unit 207 represents, for example, position information of a moving destination, to which the rectangular region represented as the variable information of the four elements is moved, as a coordinate position "xc", "yc".

The CopyRect-information creating unit 207 generates, as CopyRect information, for example, variable information (x, y, w, h, xc, yc) of six elements obtained by combining the region information of the partial region, the display position of which moves, and position information of the copy source, from which the partial region is moved. The generated CopyRect information is passed to the screen-update notifying unit 208.

The update-difference creating unit 205 generates, for example, screen data of a difference region (difference region screen data) between the screen data immediately before the scroll operation and screen data updated by the scroll operation. For example, as explained with reference to FIG. 2A, the difference region screen data is the rendering information, which is displayed on the display device as the screen data after the scroll update, in a region other than the region designated by the "CopyRect information".

The screen data of the difference region is generated in, for example, an uncompressed image file format (e.g., a BMP format). The update-difference creating unit 205 passes, for example, the created difference region screen data to the update-difference converting unit 206. The update-difference converting unit 206 performs, for example, data compression processing of the difference region screen data passed from the update-difference creating unit 205. The difference region screen data applied with the data compression processing is passed to the screen-update notifying unit 208.

The screen-update notifying unit 208 transfers, for example, the difference region screen data after the data compression passed from the update-difference converting unit 206 and the CopyRect information passed from the CopyRect-information creating unit 207 to the terminal apparatus 10 as screen update information. Note that, for example, when the CopyRect information is not generated, the screen-update notifying unit 208 transfers the difference region screen data to the terminal apparatus 10 as the screen update information of the screen data involved in the scroll operation.

As illustrated in "3" surrounded by a rectangular frame in FIG. 6, the screen update information including the difference region screen data and the CopyRect information is transferred to the terminal apparatus 10, which detects the scroll operation, for example, via the communication unit 26. The terminal apparatus 10 receives, for example, the screen update information transferred from the server 20 via the network N. The screen update information is received, for example, via the communication unit 16 of the terminal apparatus 10.

(Terminal Apparatus)

In the explanatory diagram illustrated in FIG. 5, the screen-update-information acquiring unit 101 of the terminal apparatus 10 acquires, for example, screen update information received via the communication unit 16. The screen-update-information acquiring unit 101 temporarily stores, for example, the acquired screen update information in a predetermined region of the RAM of the main storage unit 13. The screen-update-information acquiring unit 101 passes, for example, the CopyRect information and the difference region screen data included in the screen update information to the smart-scroll-region estimating unit 102. The screen-update-information acquiring unit 101 passes, for example, the difference region screen data included in the screen update information to the screen update information decoder 105.

The smart-scroll-region estimating unit 102 estimates a smart scroll region, for example, on the basis of the CopyRect information and the difference region screen data passed from the screen-update-information acquiring unit 101. The smart scroll region is, for example, a scroll region where a display position of display information moves according to the scroll operation in the display region of the LCD 15A or the like of the terminal apparatus 10.

For example, when the region range of the difference region screen data is included in the moving source region of the moving region designated by the "CopyRect information", the smart-scroll-region estimating unit 102 performs region estimation for the smart scroll operation on the basis of the "CopyRect information". When the region range of the difference region screen data is included in the moving source region of the moving region designated by the "CopyRect information", the display processing is as explained using the screen data A3 illustrated in FIG. 1.

The smart-scroll-region estimating unit 102 performs, for example, decode processing of the difference region screen data and converts the difference region screen data into the difference region screen data before the data compression. Note that the decode processing of the difference region screen data may be performed by, for example, the screen update information decoder 105 or the screen-update-information acquiring unit 101. When the decode processing of the difference region screen data is performed by, for example, the screen-update-information acquiring unit 101, the screen-update-information acquiring unit 101 may pass the difference region screen data applied with the decode processing to the pseudo-scroll-buffer-update adding unit 106.

For example, the smart-scroll-region estimating unit 102 specifies that the region range of the difference region screen data applied with the decode processing is included in the moving source region of the moving region designated by the "CopyRect information". The smart-scroll-region estimating unit 102 performs region estimation for the smart scroll operation, for example, on the basis of the "CopyRect information". Note that the region for the smart scroll operation represents, for example, a display region, a display position of which moves according to the pseudo scroll operation on the display device of the LCD 15A or the like of the terminal apparatus 10.

As illustrated in the screen data A13 in "4" surrounded by a rectangular frame in FIG. 6, the smart-scroll-region estimating unit 102 performs, for example, region estimation of the smart scroll region D1 of the display device such as the LCD 15A. In a display region of the smart scroll region D1, a display position of displayed screen data moves according to the pseudo scroll operation. In screen data A13, as illustrated in the rectangular region B2 surrounded by the thin broken line, the difference region screen data is included in the smart scroll region. In the rectangular region B2, for example, an upper region of the display information "B" present below the display information "A" is displayed as screen data.

Note that, in the screen data A13, a region C1 surrounded by a broken line is screen data of a partial region excluding the smart scroll region (the rectangular region D1) of the screen data immediately before the scroll operation. The partial region represented by the region C1 surrounded by the broken line represents a partial region, a display position of which does not move (does not change) before and after the scroll operation in the display region of the display device such as the LCD 15A.

It is assumed that the "CopyRect information" is represented by, for example, variable information (x, y, w, h, xc, yc) of six elements including variable information of four elements of a partial region, a display position of which moves in the display region of the display device, and two-dimensional position information of a moving destination to which the partial region is moved. For example, it is assumed that the smart-scroll-region estimating unit 102 receives, for example, the "CopyRect information" represented by (x, y, w, h, xc, yc)=(0, 300, 1000, 500, 0, 0). The smart-scroll-region estimating unit 102 illustrated in FIG. 5 calculates a smart scroll region (xs, ys, ws, hs), for example, on the basis of the received "CopyRect information".

In the "CopyRect information" example explained above, the smart-scroll-region estimating unit 102 calculates, as the smart scroll region, a rectangular region represented by (xs, ys, ws, hs)=(xc, yc, w, y+yc)=(0, 0, 1000, 800). The smart-scroll-region estimating unit 102 temporarily stores, for example, the smart scroll region calculated on the basis of the "CopyRect information" in a predetermined region of the RAM or the like of the main storage unit 13. The smart-scroll-region estimating unit 102 passes region information of the calculated smart scroll region to the pseudo-scroll-buffer generating unit 103.

The pseudo-scroll-buffer generating unit 103 performs generation of a pseudo scroll buffer, for example, on the basis of the region information passed from the smart-scroll-region estimating unit 102. In the pseudo scroll buffer, concerning screen data displayed in the smart scroll region, display information for performing the pseudo scroll is stored. The pseudo scroll buffer is temporarily generated in, for example, a predetermined region of the RAM or the like of the main storage unit 13.

In the terminal apparatus 10 of this embodiment, the screen data of the smart scroll region is simulatively scroll-moved, for example, on the basis of the display information stored in the pseudo scroll buffer. The terminal apparatus 10 executes the pseudo scroll by, for example, according to the scroll movement, moving, on the basis of the display information stored in the pseudo scroll buffer, a display position of partial data of a display region defined by the smart scroll region.

As illustrated in screen data A14 in "5" surrounded by a rectangular frame in FIG. 6, screen data corresponding to the region range of the smart scroll region D1 moves, for example, in the display region of the display device such as the LCD 15A according to the scroll operation. The terminal apparatus 10 performs readout of the screen data corresponding to the smart scroll region D1, for example, out of display information stored in a pseudo scroll buffer BF.

For example, as illustrated in "6" surrounded by a rectangular frame in FIG. 6, the terminal apparatus 10 shifts, according to a scroll amount and a scroll direction of the scroll operation, a readout position of the screen data corresponding to the smart scroll region D1. The terminal apparatus 10 shifts, for example, a readout position of the display information of the screen data corresponding to the scroll region D1, which is stored in the pseudo scroll buffer BF, according to the scroll amount and the scroll direction. The terminal apparatus 10 specifies, for example, with a pointer or the like, the readout position of the display information stored in the pseudo scroll buffer BF and moves the pointer or the like in the scroll direction according to the scroll amount. On the display device such as the LCD 15A of the terminal apparatus 10, screen data based on the display information read out according to the scroll amount of the scroll operation is displayed as screen data of the smart scroll region D1.

Referring back to the explanatory diagram illustrated in FIG. 5, the pseudo-scroll-buffer generating unit 103 calculates, for example, a region size of the pseudo scroll buffer. The region size of the pseudo scroll buffer is, for example, a size for storing image information for performing the pseudo scroll of the screen data displayed in the smart scroll region D1. The pseudo-scroll-buffer generating unit 103 calculates, for example, a buffer region having a region size twice as large as the smart scroll region as the region size of the pseudo scroll buffer.

However, the region size of the pseudo scroll buffer is not limited to the region size twice as large as the smart scroll region. The region size of the pseudo scroll buffer can be set, for example, according to a storage capacity of the RAM or the like and a scroll movement amount.

The pseudo-scroll-buffer generating unit 103 may calculate the region size of the pseudo scroll buffer, for example, according to a data amount of the screen data displayed as the smart scroll region. For example, when the screen data displayed in the smart scroll region has a data amount (a pixel amount) of "800 pixel", the pseudo scroll buffer may have a region size capable of storing a data amount of "1600 pixel".

The pseudo-scroll-buffer generating unit 103 passes, for example, region information of the generated pseudo scroll buffer to, for example, the pseudo-scroll-buffer-display managing unit 104. The pseudo-scroll-buffer-display managing unit 104 performs, for example, display management concerning the display information stored in the pseudo scroll buffer. Note that the pseudo scroll buffer includes display information moved from the moving source region to the display position at the moving destination on the basis of the "CopyRect information" and display information based on the rendering information of the difference region screen data.

The pseudo-scroll-buffer-display managing unit 104 stores, for example, display information based on the "CopyRect information" in the generated pseudo scroll buffer. The pseudo-scroll-buffer-display managing unit 104 stores, for example, display information based on the difference region screen data passed from the pseudo-scroll-buffer-update adding unit 106 in the pseudo scroll buffer.

Note that update information sent from the server 20 at any time is acquired by the screen-update-information acquiring unit 101 and, after the decoder processing by the screen update information decoder 105 is applied to the update information, passed via the pseudo-scroll-buffer-update adding unit 106. The pseudo-scroll-buffer-update adding unit 106 passes, for example, display information (screen data) of an updated screen based on the update information applied with the decode processing to the pseudo-scroll-buffer-display managing unit 104. The pseudo-scroll-buffer-display managing unit 104 stores, for example, the display information of the updated screen based on the update information passed from the pseudo-scroll-buffer-update adding unit 106 in the pseudo scroll buffer.

As a result, as illustrated in the pseudo scroll buffer BF of FIG. 6, rendering information of display information "A", "B", and "C" of contents being browsed is stored in the pseudo scroll buffer BF.

The pseudo-scroll-buffer-display managing unit 104 performs, for example, display management of screen data involved in the pseudo scroll operation. The display management of the screen data involved in the pseudo scroll operation is performed, for example, on the basis of the display information based on the "CopyRect information" and the display information passed from the pseudo-scroll-buffer-update adding unit 106. The pseudo-scroll-buffer-display managing unit 104 performs, for example, according to a scroll amount and a scroll direction of the pseudo scroll operation, reading of the screen data displayed in the display region of the display device such as the LCD 15A. Note that the scroll amount of the pseudo scroll operation may be changed, for example, according to a movement amount of a moving region included in the "CopyRect information".

The pseudo-scroll-buffer-display managing unit 104 designates, with a pointer or the like, for example, according to the smart scroll region, a reading position for the display information stored in the pseudo scroll buffer. The pseudo-scroll-buffer-display managing unit 104 shifts and moves, for example, according to a scroll amount and a scroll direction involved in the pseudo scroll operation, the reading position for the display information stored in the pseudo scroll buffer. The pseudo-scroll-buffer-display managing unit 104 reads, for example, display information equivalent to the smart scroll region starting from the reading position after the movement. The pseudo-scroll-buffer-display managing unit 104 passes, for example, the read display information to the image-data display unit 107.

The image-data display unit 107 generates, for example, image data on the basis of the display information passed from the pseudo-scroll-buffer-display managing unit 104. The generated image data is displayed on, for example, the display device such as the LCD 15A of the terminal apparatus 10. The image-data display unit 107 performs adjustment of a display position in the display device of the display information displayed on the display device such as the LCD 15A. For example, when the smart scroll region moves according to the pseudo scroll operation, a display position of the display information passed from the pseudo-scroll-buffer-display managing unit 104 is adjusted.

The image-data display unit 107 displays, for example, the display information, a display position of which is adjusted, on the screen display unit, which is the display device such as the LCD 15A. The image-data display unit 107 displays the screen data A13 or the like illustrated in "4" surrounded by the rectangular frame in FIG. 6 in the display region of the display device such as the LCD 15A. The image-data display unit 107 displays, for example, display information of the smart scroll region, the display position of which is adjusted, and display information of a region, a display position of which does not change before and after the scroll operation, in the display region of the display device. In the display region of the display device such as the LCD 15A, as illustrated in the screen data A13 and A14 in FIG. 6, a display region, a display position of which moves according to the pseudo scroll operation, and a display region, a display position of which does not change before and after the pseudo scroll operation, are displayed.

[Processing Flow]

Processing related to updated screen display in the scroll operation or the like of the thin client system 1 of this embodiment is explained below with reference to flowcharts illustrated in FIGS. 7A and 7B. The terminal apparatus 10 of the thin client system 1 executes processing related to updated screen display illustrated in FIG. 7A according to, for example, a computer program developed in the RAM or the like of the main storage unit 13 to be executable. The server 20 of the thin client system 1 executes processing related to updated screen display illustrated in FIG. 7B according to, for example, a computer program developed in the main storage unit 22 to be executable.

[Terminal Apparatus]

A flowchart of the processing related to the updated screen display of the terminal apparatus 10 of this embodiment is illustrated in FIG. 7A. In the flowchart illustrated in FIG. 7A, as a start of the processing related to the updated screen display of the terminal apparatus 10, for example, time of display of screen data on the display device such as the LCD 15A can be illustrated. The terminal apparatus 10 displays, for example, the screen data on the display device such as the LCD 15A on the basis of rendering information transferred from the server 20.

The terminal apparatus 10 determines, for example, presence or absence of occurrence of user operation in a state in which screen data is displayed on the display device such as the LCD 15A (S1). The terminal apparatus 10 receives, for example, via the input device such as the pointing device of the input unit 14, user operation for the screen data or the like displayed on the LCD 15A or the like. For example, when the user operation does not occur in a state in which the screen data is displayed on the display device such as the LCD 15A (NO in S1), the terminal apparatus 10 stays on standby until user operation such as update of the screen data is received.

On the other hand, for example, when the user operation is received via the input unit 14 (YES in S1), the terminal apparatus 10 shifts to processing in S2. In the processing in S2, the terminal apparatus 10 sequentially transmits, for example, operation information of the user operation received via the input unit 14 to the server 20. When the user operation received via the input unit 14 is operation related to update of the screen data displayed on the display device such as the LCD 15A, the terminal apparatus 10 transmits operation information such as a scroll operation command to the server 20.

The terminal apparatus 10 transmits, as the operation information of the scroll operation related to the update of the screen data, a moving direction, a movement amount, and the like for moving the display information of the display region of the display device to the server 20, for example, as explained with reference to the screen G1 illustrated in FIG. 2A. The moving direction of the display information displayed in the display region of the LCD 15A or the like can be represented using, for example, a sign with an upward direction set as "+" and a downward direction set as "−". The terminal apparatus 10 adds, for example, a sign representing the moving direction to a movement amount "z" of the display region of the display device and transmits the movement amount to the server 20 as the operation information of the scroll operation related to the update of the screen data.

In processing in S3, the terminal apparatus 10 determines, for example, presence or absence of reception of update data related to update of the screen data displayed on the display device such as the LCD 15A. For example, when the update data related to the update of the screen data is not received (NO in S3), the terminal apparatus 10 shifts to the processing in S1 and stays on standby until user operation for the update or the like of the screen data is received. On the other hand, for example, when the update data related to the update of the screen data is received (YES in S3), the terminal apparatus 10 shifts to processing in S4. The update data includes, for example, the "CopyRect information", the difference region screen data, and screen data additionally transmitted from the server 20 at any time. Note that the "CopyRect information", the difference region screen data, and the screen data additionally transmitted from the server 20 at any time are explained above with reference to FIGS. 5 and 6 and the like.

In the processing in S4, the terminal apparatus 10 determines, for example, whether the received update data includes the "CopyRect information". For example, when the update data does not include the "CopyRect information" (NO in S4), the terminal apparatus 10 shifts to processing in S9. In the processing in S9, it is determined whether a region range of the screen data based on the received update data is within the smart scroll region.

On the other hand, for example, when the "CopyRect information" is included in the update data received in the processing in S3 (YES in S4), the terminal apparatus 10 shifts to processing in S5. In the processing in S5, the terminal apparatus 10 determines, for example, whether a region range of the difference region screen data is included in a moving source region of a moving region designated by the "CopyRect information". For example, when the region range of the difference region screen data is not included in the moving source region of the moving region designated by the "CopyRect information" (NO in S5), the terminal apparatus 10 shifts to processing in S13.

For example, it is assumed that, after the moving region designated by the "CopyRect information" is copied and used, screen data attached with image data or the like is added and displayed. In such a case, in the processing in S13, for example, the frame buffer 204 related to display of the screen data on the display device such as the LCD 15A is updated on the basis of the update data received in the processing in S3. On the display device such as the LCD 15A of the terminal apparatus 10, the screen data subjected to display processing on the basis of the updated frame buffer 204 is displayed.

For example, in the processing in S13, screen data of a partial region subjected to copying processing on the basis of the "CopyRect information" is displayed on the display device such as the LCD 15A. On the display device such as the LCD 15A, the screen data of the partial region subjected to the display processing on the basis of the difference region screen data is displayed. Note that, on the display device such as the LCD 15A, for example, the screen data of the partial region, the display position of which does not move in the copy source region is displayed.

On the other hand, for example, when the region range of the difference region screen data is included in the moving source region of the moving region designated by the "CopyRect information" in the processing in S5 (YES in S5), the terminal apparatus 10 executes processing in S6 to S12.

In the processing in S6 to S12, processing for performing the pseudo scroll operation of screen data displayed in the smart scroll region is performed. For example, the terminal apparatus 10 generates a pseudo scroll buffer. The terminal apparatus 10 generates, for example, screen data to be scroll-displayed in the pseudo scroll operation. The generated screen data to be scroll-displayed is stored in the pseudo scroll buffer.

Note that the smart scroll region is, for example, a region where a display position of display information moves according to the scroll operation in the display region of the LCD 15A or the like of the terminal apparatus 10. The movement of the display position involved in the scroll operation is performed, for example, on the basis of display information stored in the pseudo scroll buffer. For example, in the processing in S13, the display information stored in the pseudo scroll buffer is reflected on the frame buffer 204 displayed in the display region of the display device such as the LCD 15A. Note that the processing in S6 to S12 is explained with reference to the screen data A13 and A14 illustrated in FIGS. 5 and 6.

In the processing in S6, the terminal apparatus 10 estimates a smart scroll region on the basis of the "CopyRect information". It is assumed that the "CopyRect information" is, for example, variable information of six elements represented by (x, y, w, h, xc, yc)=(0, 300, 1000, 500, 0, 0). The terminal apparatus 10 calculates, for example, a rectangular region (0, 0, 1000, 800) represented by (xs, ys, ws, hs)=(xc, yc, w, y+yc) as the smart scroll region. The terminal apparatus 10 passes, for example, the calculated smart scroll region to the processing in S7.

In the processing in S7, the terminal apparatus 10 generates a pseudo scroll buffer, for example, according to a region size of the smart scroll region calculated in the processing in S6. The pseudo scroll buffer is temporarily generated, for example, in a predetermined region of the RAM or the like of the main storage unit 13.

The pseudo scroll buffer generated in the processing in S7 can be illustrated as being set to, for example, a region size twice as large as the smart scroll region. However, the region size of the pseudo scroll buffer is not limited to the region size twice as large as the smart scroll region. The region size of the pseudo scroll buffer can be set, for example, according to a storage capacity of the RAM or the like, a scroll movement amount, and the like. The region size of the pseudo scroll buffer can be changed, for example, according to a data amount of screen data added and stored in the pseudo scroll buffer. The terminal apparatus 10 passes, for example, region information of the generated pseudo scroll buffer to the processing in S8.

In the processing in S8, the terminal apparatus 10 performs, for example, calculation and correction of the display position of the display information stored in the pseudo scroll buffer. In the terminal apparatus 10, the calculation and the correction of the display position of the display information of the pseudo scroll buffer are performed, for example, on the basis of a display region of screen data displayed immediately before the occurrence of the scroll operation.

The terminal apparatus 10 moves, for example, on the basis of the "CopyRect information", a moving region included in the moving source region to the pseudo scroll buffer. The terminal apparatus 10 specifies, for example, on the basis of the "CopyRect information", the moving region included in the moving source region. For example, the terminal apparatus 10 sets a head position of the pseudo scroll buffer as a moving designation designated by the "CopyRect information" and moves the specified moving region. In a head region of the pseudo scroll buffer, the moving region moved from the moving source region designated by the "CopyRect information" is stored. Note that, in the case of scroll in the downward direction, for example, it is possible to move the moving region to set a lower end position of the moving region included in the moving source region as a lower end position of the pseudo scroll buffer. In a lower end region of the pseudo scroll buffer, the moving region moved from the moving source region designated by the "CopyRect information" is stored.

The terminal apparatus 10 performs the calculation and the correction of the display position of the display information stored in the pseudo scroll buffer such that, for example, the head position of the pseudo scroll buffer and the position information of the moving destination of the "CopyRect information" coincide with each other. Note that, in the case of the scroll in the downward direction, the calculation and the correction of the display position of the display information stored in the pseudo scroll buffer are performed such that, for example, the lower end position of the pseudo scroll buffer and the position information of the moving destination of the "CopyRect information" coincide with each other.

The calculation and the correction of the display position are performed in the processing in S8. The display information stored in the pseudo scroll buffer is reflected on the frame buffer 204. For example, the terminal apparatus 10 shifts to the processing in S13 and performs update of the frame buffer 204 on the basis of the display information stored in the pseudo scroll buffer.

In the processing in S9, the terminal apparatus 10 determines, for example, whether an update region of the screen data is within the smart scroll region. The screen data includes, for example, the difference region screen data determined in the "NO" processing in S4, the screen update data acquired at any time after the generation of the pseudo scroll buffer, and the difference region screen data determined in the processing in S5 (YES in S5). The terminal apparatus 10 determines, for example, the region range of the screen data is within the smart scroll region.

For example, when the update region of the screen data is not within the smart scroll region (NO in S9), the terminal apparatus 10 shifts to the processing in S13 and performs update of the frame buffer 204 on the basis of the acquired screen data. For example, the difference region screen data determined in the "NO" processing in S4 and the screen update data acquired at any time after the generation of the pseudo scroll buffer are outside the smart scroll region. In such a case, in the processing in S13, update of the frame buffer 204 is performed on the basis of the acquired screen data.

On the other hand, for example, when the update region of the screen is within the smart scroll region (YES in S9), the terminal apparatus 10 shifts to the processing in S10. In the processing in S10, for example, it is determined whether the screen update data acquired at any time after the generation of the pseudo scroll buffer can be stored in the pseudo scroll buffer generated in the processing in S7.

For example, the terminal apparatus 10 performs comparison of a size of the screen update data and a free space of the pseudo scroll buffer generated in the processing in S7 and determines whether storage of the screen update data is possible or not. For example, when the screen update data can be stored in the present pseudo scroll buffer (YES in S10), the terminal apparatus 10 shifts to the processing in S12.

On the other hand, for example, when the screen update data is unable to be stored in the present pseudo scroll buffer (NO in S10), the terminal apparatus 10 shifts to the processing in S11. In the processing in S11, the terminal apparatus 10 expands, for example, the region size of the pseudo scroll buffer generated in the processing in S7. The region size of the pseudo scroll buffer is expanded to be capable of storing the size of the screen update data.

In the processing in S12, still image screen data of the update region is generated, for example, on the basis of the difference region screen data and the screen update data after the generation of the pseudo scroll buffer. For example, the terminal apparatus 10 performs rendering processing on the basis of the difference region screen data and the screen update data and generates the still image screen data of the update region. The terminal apparatus 10 adds, for example, the generated still image screen data to the pseudo scroll buffer. The generated still image screen data is added to the pseudo scroll buffer according to the position of the update region. The still image screen data corresponding to the update region of the screen added to the pseudo scroll buffer is reflected on the frame buffer 204.

The processing in S1 to S3 and S7 to S13 executed in the terminal apparatus 10 is an example of processing for acquiring, according to the scroll operation of the display unit, rendering data including a connection portion, which is connected to a residual portion displayed in a moving destination region on a screen after operation from a screen before the operation and is displayed, storing, in a display buffer (buffer memory) for storing the rendering data including the moving destination region and the connection portion, the rendering data of the residual portion and the rendering data including the connection portion, and displaying, according to the scroll operation, in response to update of a display position of the rendering data stored in the display buffer, the rendering data, a display position of which is updated, on the display unit after the operation. The CPU 11 or the like of the terminal apparatus 10 executes the processing in S1 to S3 and S7 to S13 as an example of processing for acquiring, according to the scroll operation of the display unit, rendering data including a connection portion, which is connected to a residual portion displayed in a moving destination region on a screen after operation from a screen before the operation and is displayed, storing, in a display buffer for storing the rendering data including the moving destination region and the connection portion, the rendering data of the residual portion and the rendering data including the connection portion, and displaying, according to the scroll operation, in response to update of a display position of the rendering data stored in the display buffer, the rendering data, the display position of which is updated, on the display unit after the operation.

The processing in S4 to S6 executed by the terminal apparatus 10 is an example of processing for, when a region range of the rendering data of the connection portion is included in a region range of the residual portion of the screen before the operation, estimating a range of the rendering data displayed on the display unit after the operation from a region range including a region where the residual portion is present before the operation and a moving destination region. The CPU 11 or the like of the terminal apparatus 10 executes the processing in S4 to S6 as an example of processing for, when a region range of the rendering data of the connection portion is included in a region range of the residual portion of the screen before the operation, estimating a range of the rendering data displayed on the display unit after the operation from a region range including a region where the residual portion is present before the operation and a moving destination region.

[Server]

In FIG. 7B, a flowchart of processing related to the updated screen display in the server 20 of this embodiment is illustrated. In the flowchart illustrated in FIG. 7B, as a start of the processing related to the updated screen display of the server 20, for example, time of transmission of screen data of a display screen after a start of the server 20 to the terminal apparatus 10 can be illustrated.

For example, the server 20 determines whether a fixed period elapses from time when the screen data of the display screen after the start is transmitted to the terminal apparatus 10 (S21). For example, when the fixed period does not elapse after the transmission of the screen data (NO in S21), the server 20 stays on standby until the fixed period elapses. On the other hand, for example, when the fixed period elapses after the transmission of the screen data (YES in S21), the server 20 shifts to processing in S22.

In the processing in S22, the server 20 determines, for example, presence or absence of update of the frame buffer 204, which is a buffer for display processing for the display device such as the LCD 25A. For example, when the update of the frame buffer 204 is present (YES in S22), the server 20 shifts to processing in S25. On the other hand, for example, when the update of the frame buffer 204 is absent (NO in S22), the server 20 shifts to processing in S23.

In the processing in S23, the server 20 determines, for example, presence or absence of reception of operation information of the user transmitted from the terminal apparatus 10. For example, when the reception of the operation information of the user transmitted from the terminal apparatus 10 is absent (NO in S23), the server 20 repeats the processing in S21 to S23. On the other hand, for example, when the reception of the operation information of the user transmitted from the terminal apparatus 10 is present (YES in S23), the terminal apparatus 10 shifts to processing in S24. In the processing in S24, the server 20 reflects, for example, the received operation information of the user on the OS executing unit 202. The received operation information of the user is reflected on, for example, processing of an OS, an application, and the like related to the display screen after the start via the OS executing unit 202. For example, after the execution of the processing in S24, the server 20 repeats the processing in S21 to S24.

In the processing in S25, the server 20 performs, for example, on the basis of data stored in the updated frame buffer 204, creation of screen update data related to the update of the screen data. The server 20 creates the difference region screen data, for example, on the basis of the data stored in the updated frame buffer 204. The server 20 creates the "CopyRect information", for example, on the basis of the data stored in the updated frame buffer 204.

The server 20 temporarily stores, for example, the created difference region screen data and the created "CopyRect information" in a predetermined region of the main storage unit 22. In the processing in S26, the server 20 transmits the screen update data related to the update of the screen data created in the processing in S25 to the terminal apparatus 10 via the network N. Note that, for example, when the "CopyRect information" is not created, the server 20 transmits the difference region screen data to the terminal apparatus 10 as the screen update data.

As explained above, in the terminal apparatus 10 of this embodiment, it is possible to estimate, on the basis of the difference region screen data and the "CopyRect information", the scroll region (the smart scroll region), the display position of which moves in the display region of the display device. For example, when the region range of the difference region screen data is included in the moving source region of the moving region designated by the "CopyRect information", the terminal apparatus 10 estimates the scroll region.

In the terminal apparatus 10 of this embodiment, it is possible to dynamically set the pseudo scroll buffer on the basis of the estimated smart scroll region. The region size of the pseudo scroll buffer can be set, for example, larger than an estimated region size of the smart scroll region. In the pseudo scroll buffer, for example, the still image screen data of the partial region moved from the moving source region on the basis of the "CopyRect information" is stored. The partial region moved from the moving source region on the basis of the "CopyRect information" is a display region, a display position of which moves before and after the screen update. In the pseudo scroll buffer, for example, the still image screen data of the difference region screen data displayed in the smart scroll region is stored. In the pseudo scroll buffer, for example, the still image screen data of the screen update region transmitted at any time from the server 20 is stored.

In the terminal apparatus 10 of this embodiment, it is possible to perform the pseudo scroll display of the smart scroll region on the basis of the still image screen data stored in the pseudo scroll buffer. The terminal apparatus 10 changes, for example, according to a moving direction of the display region in the smart scroll region, a display position of the still image screen data stored in the pseudo scroll buffer. In the terminal apparatus 10, for example, the still image screen data stored in the pseudo scroll buffer corresponding to the smart scroll region is displayed on the display device with the display position changed according to the movement of the scroll operation.

As a result, in the terminal apparatus 10 of this embodiment, it is possible to perform the pseudo scroll display of the smart scroll region. Therefore, operability involved in the scroll operation is improved. In the terminal apparatus 10 of this embodiment, moving processing based on the "CopyRect information" is limited to moving processing to the pseudo scroll buffer. Therefore, it is possible to reduce a processing load related to the update display of the screen data. In the terminal apparatus 10 of this embodiment, it is possible to update, at any time, the still image screen data of the screen update region stored in the pseudo scroll buffer. Therefore, the terminal apparatus 10 can suppress inappropriate rendering such as a position shift of the display information involved in the pseudo scroll operation. A data amount of the screen update region updated at any time is relatively smaller than an update data amount for each display screen displayed on the display device. Therefore, it is possible to suppress an increase in a data transfer amount involved in the scroll operation.

In the thin client system of this embodiment, it is possible to provide a technique for suppressing an increase in a data transfer amount and an increase in a processing load in the scroll operation and enabling appropriate rendering of screen information.

[Modification]

In the thin client system 1 of the embodiment, the terminal apparatus 10 estimates the smart scroll region on the basis of the "CopyRect information" transmitted from the server 20. Note that, in the following explanation, a region designated by the "CopyRect information" is referred to as "moving region".

For example, when a movement amount of generated scroll operation is large relatively to screen data in which contents such as a Web page being browsed are displayed, a region size of the moving region designated by the "CopyRect information" tends to be small. For example, when the movement amount of the scroll operation exceeds ¾ of a region size of a moving source region, the region size of the moving region designated by the "CopyRect information" is smaller than ¼ of the region size of the moving source region.

For example, when the contents being browsed include image data or the like superimposed on a background image, depending on a display position of the image data, it is assumed that the display position deviates from the moving region designated by the "CopyRect information". For example, it is assumed that a screen before the scroll operation includes image data superimposed on a background image. When a part of a display range on the screen of the image data is included in the moving region, in the server 20, it is likely that the moving region designated by the "CopyRect information" is generated in a region range excluding the screen data. Even in such a case, the region size of the moving region designated by the "CopyRect information" is limited to a narrow region. In both the cases, the smart scroll region estimated on the basis of the "Copy-Rect information" tends to be limited to a relatively narrow region.

Figure 8A:
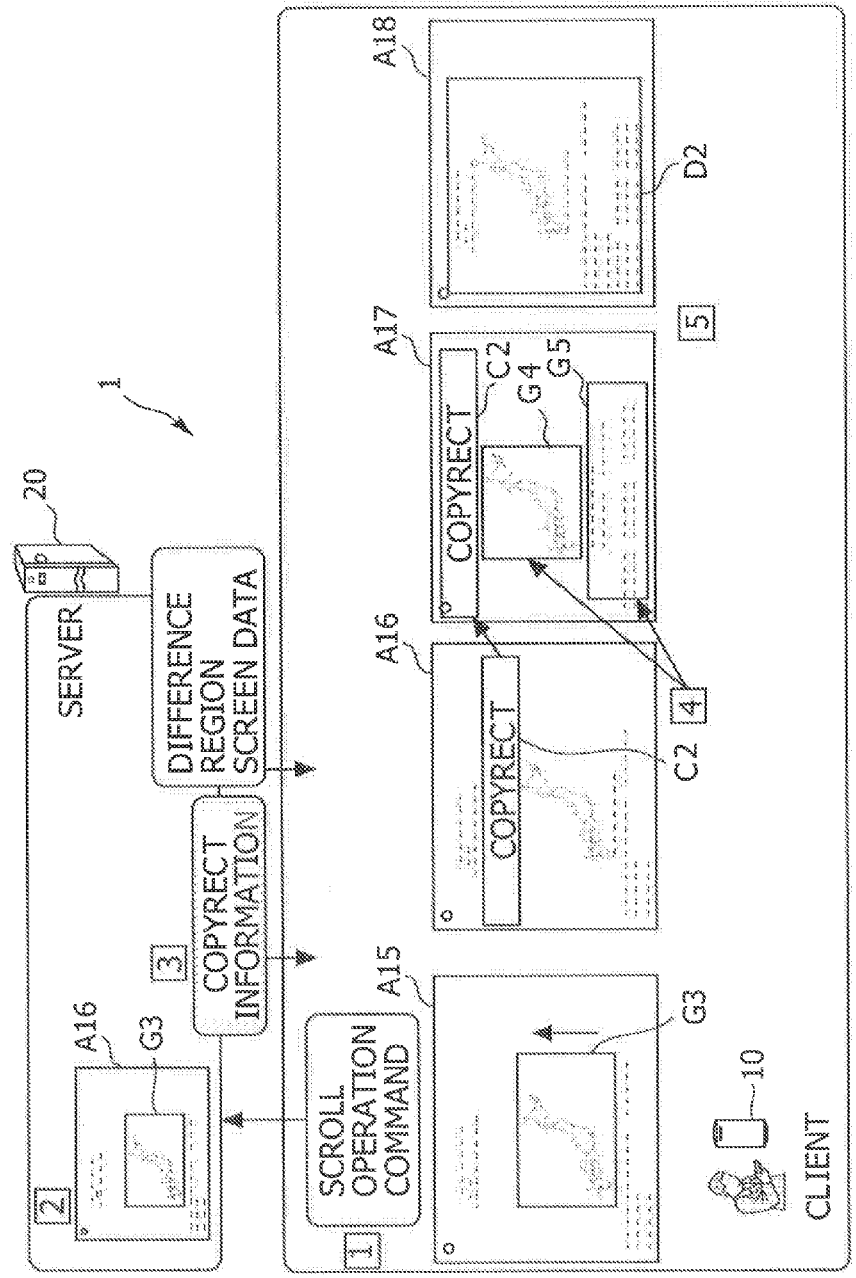
FIG. 8A is an explanatory diagram for explaining estimation processing for a smart scroll region of a modification.

In processing related to updated screen display such as scroll operation of a thin client system of a modification, for example, the terminal apparatus 10 combines information of difference region screen data with the "CopyRect information" and performs estimation of a smart scroll region. Estimation processing for the smart scroll region of the modification is explained below with reference to the drawings of FIGS. 8A and 8B. The drawings illustrated in FIGS. 8A and 8B are explanatory diagrams for explaining the estimation processing for the smart scroll region of the modification. Note that the hardware configurations of the terminal apparatus 10 and the server 20 in the modification are the same as the hardware configurations in the embodiment.

In the explanatory diagram illustrated in FIG. 8A, on the display device such as the LCD 15A of the terminal apparatus 10, screen data A15 by contents such as a Web page being browsed is displayed. The screen data A15 includes image data G3 superimposed and attached on a background image of the contents. In the terminal apparatus 10 that is displaying the screen data A15 on the display device such as the LCD 15A, for example, scroll operation for the screen data A15 occurs. In the terminal apparatus 10 in which the scroll operation occurs, for example, as illustrated in "1" surrounded by a rectangular frame, operation information such as a scroll operation command is transmitted to the server 20. Note that the operation information transmitted to the server 20 is the same as the operation information in the embodiment.

As illustrated in "2" surrounded by a rectangular frame in FIG. 8A, on the display device such as the LCD 25A included in the server 20, for example, screen data A16 of contents such as a Web page acquired by a browser application is displayed. The screen data A16 includes the image data G3 superimposed and attached on a background image of the contents.

In the server 20, as in the embodiment, updated screen information (difference region screen data and "CopyRect information") is generated on the basis of the operation information transmitted from the terminal apparatus 10. The server 20 notifies, for example, the browser application in operation of the received operation information and generates updated screen information including the difference region screen data and the "CopyRect information".

As illustrated in "3" surrounded by a rectangular frame in FIG. 8A, the updated screen information including the difference region screen data and the "CopyRect information" generated by the server 20 is transmitted to the terminal apparatus 10. Note that a rectangular region C2 of the screen data A16 represents, for example, a moving region designated by the "CopyRect information".

Screen data A17 illustrated in "4" surrounded by a rectangular frame in FIG. 8A is a screen example for explaining a state of the updated screen information transmitted from the server 20. In the screen data A17, the rectangular region C2 indicates a state in which the moving region designated by the "CopyRect information" is moved to a moving destination. As illustrated in the screen data A17, in the server 20, the "CopyRect information" related to the updated screen is generated in a partial region in a relatively narrow region range.

As illustrated in the screen data A17, for example, the image data G3 superimposed and attached on the background image of the contents is transmitted from the server 20 as difference region screen data G4. Note that, in the screen data A17, difference region screen data G5 located in a lower region of the difference region screen data G4 represents, for example, information such as a text included in the screen data A17 after the update.

When screen data after the update is generated on the basis of the updated screen information transmitted from the server 20, the screen data after the update is generated by the difference region screen data G4 and G5 that occupy most of the region of the screen data. Even if a smart scroll region is estimated on the basis of the "CopyRect information", a region range of the estimated smart scroll region is narrow. Therefore, an effect by pseudo scroll display for moving display content displayed in the smart scroll region is small. For example, the scroll region is limited to the inside of the rectangular region C2.

In the terminal apparatus 10 of the modification, the "CopyRect information" and the difference region screen data are combined and the smart scroll region is estimated on condition that the screen update information transmitted from the server 20 satisfies a predetermined relation. In the terminal apparatus 10 of the modification, for example, as illustrated in a rectangular region D2 of screen data A18 in FIG. 8A, the smart scroll region is estimated on the basis of a moving region designated by the "CopyRect information" and the difference region screen data. In the terminal apparatus 10 of the modification, a region range including the rectangular region C2 and the difference region data G4 and G5 illustrated in the screen data A17 can be estimated as the smart scroll region.

(Estimation Processing for the Smart Scroll Region)

The terminal apparatus 10 of the modification performs estimation of the smart scroll region, for example, on condition that the "CopyRect information" and the difference region screen data transmitted from the server 20 satisfy relations 1 and 2 described below.

Relation 1: The difference region screen data related to the updated screen is generated at timing (in a frame) same as the timing of generation of the "CopyRect information".

Relation 2: The difference region screen data related to the updated screen is not included in the moving source region of the moving region designated by the "CopyRect information".

In the explanatory diagram illustrated in FIG. 8B, as illustrated in the screen data A17, it is assumed that the screen update information transmitted from the server 20 includes the rectangular region C2 and the difference region screen data G4 and G5. The rectangular region C2 represents, for example, the moving region in the moving source region designated by the "CopyRect information".

For example, the terminal apparatus 10 determines that the screen update information transmitted from the server 20 includes the difference region screen data G4 and G5 and the "CopyRect information". This is because, when the difference region screen data and the "CopyRect information" are included in the screen update information, it can be estimated that the difference region screen data and the "Copy-Rect information" are generated at the same timing (in the same frame). Note that the difference region screen data and the "CopyRect information" generated from the same frame are displayed in one screen after the scroll operation.

For example, the terminal apparatus 10 determines that a region range of the difference region screen data G4 and G5 transmitted from the server 20 is not included in the moving source region of the moving region designated by the "CopyRect information". It is determined that, in the screen data A17, the difference region screen data G4 and G5 are not included in the moving source region moving in the moving region designated by the "CopyRect information". For example, in the screen data A15 before the scroll, the image data G3 is not included in a region, a display region of which moves according to the scroll movement. Therefore, it is determine that the difference region screen data G4 is not included in the moving source region of the moving region designated by the "CopyRect information". The terminal apparatus 10 combines the "CopyRect information" and the difference region screen data of the screen update information transmitted from the server 20 and estimates the smart scroll region illustrated in the rectangular region D2 of the screen data A18 illustrated in FIG. 8B.

For example, it is assumed that screen update information described below is transmitted from the server 20.

CopyRect information (x, y, w, h, xc, yc)=(20, 300, 800, 200, 20, 40)

Difference region screen data G4 (x, y, w, h)=(100, 510, 200, 200)

Difference region screen data G5 (x, y, w, h)=(20, 700, 700, 300)

For example, the terminal apparatus 10 executes processing of procedures 1 and 2 described below and estimates the smart scroll region represented by the rectangular region D2 of the screen data A18.

Procedure 1: For example, the terminal apparatus 10 calculates region information after movement from the "CopyRect information". The region information after the movement can be calculated as, for example, (xc, yc, w, h). In the example of the "CopyRect information" explained above, region information after movement (xc, yc, w, h)=(20, 40, 800, 200) is calculated.

Procedure 2: For example, the terminal apparatus 10 calculates a rectangular region including all of the region information after the movement (xc, yc, w, h) and the region information (x, y, w, h) of the difference region screen data G4 and G5. For example, the terminal apparatus 10 calculates the region range (xf, yf, wf, hf) from the region information after the movement (xc, yc, w, h). Coordinate information of an upper left corner portion of a region range can be represented as "(xf, yf)". Coordinate information of a lower right corner portion of the region range can be represented as "(wf, hf)". That is, from region information (x1, y1, w1, h1), coordinate information (x1, y1) indicating the upper left corner portion of the region range and coordinate information (w1f, h1f)=(x1+w1, y1+h1) indicating the lower right corner portion of the region range are calculated.

Therefore, from the region information after the movement (xc, yc, w, h), a region range (xf, yf, wf, hf)=(20, 40, 820, 240) is calculated. From the region information (x, y, w, h) of the difference region screen data G4, a region range (xf, yf, wf, hf)=(100, 510, 300, 710) is calculated. From the region information (x, y, w, h) of the difference region screen data G5, a region range (xf, yf, wf, hf)=(20, 700, 720, 1000) is calculated.

The terminal apparatus 10 specifies, by comparing the calculated coordinates of the region ranges, a region range obtained by combining minimum coordinate information (xf, yf) and maximum coordinate information (wf, hf). In the example explained above, the minimum coordinate information (xf, yf) is (20, 40) and the maximum coordinate information (wf, hf) is (820, 1000). The terminal apparatus 10 specifies "(20, 40, 820, 1000)" as a region range (xf, yf, wf, hf) of a rectangular region including all of the region information after the movement (xc, yc, w, h) and the region information (x, y, w, h) of the difference region screen data G4 and G5.

In the terminal apparatus 10 of the modification, the region range (xf, yf, wf, hf) of the rectangular region including all of the region information after the movement (xc, yc, w, h) and the region information (x, y, w, h) of the difference region screen data G4 and G5 is estimated as the smart scroll region. In the terminal apparatus 10 of the modification, as in the embodiment, a pseudo scroll buffer for performing pseudo scroll display is generated on the basis of the estimated smart scroll region. In the terminal apparatus 10 of the modification, the region range of the rectangular region including all of the region information after the movement and the region information of the difference region screen data G4 and G5 can be set as the smart scroll region. Therefore, even if the moving region designated by the "CopyRect information" is a narrow range, it is possible to estimate the smart scroll region. Even when the contents being browsed include image data or the like superimposed on a background image, it is possible to estimate a smart scroll region including a display range of the image data.

(Processing Flow)

In FIG. 8C, a flowchart of processing related to updated screen display of the terminal apparatus 10 of the modification is illustrated. Note that the processing related to the updated screen display of the modification is processing additionally executed in the "NO" determination processing in S5 illustrated in FIG. 7A. Therefore, in the flowchart illustrated in FIG. 8C, a processing portion added by the modification is illustrated. The processing portion added by the modification is explained below with reference to FIG. 8C. Note that, in the server 20 connected to the terminal apparatus 10 of the modification, processing same as the processing illustrated in FIG. 7B is performed.

In the flowchart illustrated in FIG. 8C, when the region range of the difference region screen data is included in the moving source region of the moving region designated by the "CopyRect information" in the processing in S5 (YES in S5), the processing in S6 to S12 is executed. When the region range of the difference region screen data is not included in the moving source region of the moving region designated by the "CopyRect information" in the processing in S5 (NO in S5), the terminal apparatus 10 shifts to the processing in S21. In the processing in S21, the terminal apparatus 10 combines the "CopyRect information" and the difference region screen data of the screen update information transmitted from the server 20 and estimates the smart scroll region illustrated in the rectangular region D2 of the screen data A18 illustrated in FIG. 8B.

In the processing in S21, for example, as explained in the procedure 1, the terminal apparatus 10 calculates the region information after the movement (xc, yc, w, h) from the "CopyRect information". As explained in the procedure 2, the terminal apparatus 10 calculates the rectangular region (xf, yf, wf, hf) including all of the region information after the movement (xc, yc, w, h) and the difference region screen data region information (x, y, w, h). The terminal apparatus 10 calculates, as the smart scroll region, the rectangular region (xf, yf, wf, hf) including all of the region information after the movement (xc, yc, w, h) and the difference region screen data region information (x, y, w, h).

The smart scroll region calculated in the processing in S21 is passed to the processing in S22. In the processing in S22, the terminal apparatus 10 generates a pseudo scroll buffer, for example, according to a region size of the smart scroll region calculated in the processing in S21. Note that the processing in S22 is the same as the processing in S7 in FIG. 7A. For example, the pseudo scroll buffer is temporarily generated in a predetermined region of the RAM or the like of the main storage unit 13. For example, the terminal apparatus 10 passes region information of the generated pseudo scroll buffer to the processing in S23.

In the processing in S23, the terminal apparatus 10 performs, for example, calculation and correction of a display position of the display information stored in the pseudo scroll buffer. In the terminal apparatus 10, the calculation and the correction of the display position of the display information of the pseudo scroll buffer are performed, for example, on the basis of a display region of screen data displayed immediately before occurrence of scroll operation or the like.

For example, the terminal apparatus 10 specifies, on the basis of the "CopyRect information", a moving region included in the moving source region and moves the moving region to the pseudo scroll buffer. For example, the terminal apparatus 10 sets a head position of the pseudo scroll buffer as the moving destination designated by the "CopyRect information" and moves the specified moving region. The terminal apparatus 10 connects the difference region screen data to the moving region stored in the pseudo scroll buffer and stores the difference region screen data.

Note that, in the case of scroll in the downward direction, for example, it is possible to move the moving region to set a lower end position of the moving region included in the moving source region as a lower end position of the pseudo scroll buffer. In a lower end region of the pseudo scroll buffer, the moving region moved from the moving source region designated by the "CopyRect information" is stored. Similarly, the difference region screen data is connected to the moving region and stored in the pseudo scroll buffer.

The terminal apparatus 10 performs the calculation and the correction of the display position of the display information stored in the pseudo scroll buffer such that, for example, the head position of the pseudo scroll buffer and the position information of the moving destination of the "CopyRect information" coincide with each other. Note that, in the case of the scroll in the downward direction, the calculation and the correction of the display position of the display information stored in the pseudo scroll buffer are performed such that, for example, the lower end position of the pseudo scroll buffer and the position information of the moving destination of the "CopyRect information" coincide with each other.

The calculation and the correction of the display position are performed in the processing in S23. The display information stored in the pseudo scroll buffer is reflected on the frame buffer 204. For example, the terminal apparatus 10 shifts to the processing in S13 and performs update of the frame buffer 204 on the basis of the display information stored in the pseudo scroll buffer. For example, the terminal apparatus 10 updates the frame buffer 204, for example, on the basis of the moving region designated by the "CopyRect information" and the difference region screen data stored in the pseudo scroll buffer. Screen data subjected to the display processing on the basis of the updated frame buffer 204 is displayed on the display device such as the LCD 15A of the terminal apparatus 10.

The processing in S4, NO in S5 and S21 in FIG. 8C executed by the terminal apparatus 10 is an example of processing for, when a region range of the rendering data of the connection portion is not included in a region range of the residual portion of the screen before the operation and when the rendering data of the connection portion and rendering data of the residual portion are displayed in one screen after the operation, estimating a range of the rendering data displayed on the display unit after the operation from a region range including a moving destination region after the operation and the rendering data of the connection portion. The CPU 11 or the like of the terminal apparatus 10 executes the processing in S4, NO in S5 and S21 in FIG. 8C as an example of processing for, when a region range of the rendering data of the connection portion is not included in a region range of the residual portion of the screen before the operation and when the rendering data of the connection portion and rendering data of the residual portion are displayed in one screen after the operation, estimating a range of the rendering data displayed on the display unit after the operation from a region range including a moving destination region after the operation and the rendering data of the connection portion.

In the pseudo scroll buffer generated by the terminal apparatus 10 of the modification, for example, the moving region designated by the "CopyRect information" and the still image screen data created from the difference screen data G4 and G5 are stored. As in the embodiment, in the pseudo scroll buffer of the terminal apparatus 10 of the modification, for example, the still image screen data based on the screen update information transmitted from the server 20 at any time is added. In the terminal apparatus 10 of the modification as well, it is possible to perform the pseudo scroll display of the smart scroll region by the still image screen data stored in the pseudo scroll buffer. As a result, in the thin client system of the modification as well, it is possible to provide a technique for suppressing an increase in a data transfer amount and an increase in a processing load in the scroll operation and enabling appropriate rendering of screen information.

<Computer Readable Recording Medium>

It is possible to record a program which causes a computer, machine, system (hereinafter, described as computer or the like) to implement any of the functions described above on a computer readable recording medium. By causing the computer or the like to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer or the like. Of such recording media, those detachable from the computer or the like include, e.g., a flexible disk, a magneto-optical disk, a CD-ROM, a CD-R/W, a DVD, a Blu-ray disc, a DAT, an 8-mm tape, a flash memory and a memory card. Of such recording media, those fixed to the computer or the like include a hard disk, a ROM or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A terminal apparatus comprising:
   a buffer memory that stores display information concerning image data displayed on a display device; and
   a processor that stores, according to scroll operation of the display device, the display information including first data that overlaps between first image data displayed on the display device before the scroll operation and second image data displayed on the display device after the scroll operation, and second data added to the second image data based on the scroll operation, in the buffer memory, and updates, according to the scroll operation after the second image data is displayed on the display device, in response to update of a display position of the display information stored in the buffer memory, the image data displayed on the display device based on the display information, the display position of which is updated.

2. The terminal apparatus according to claim 1, wherein, when a region range of the second data is included in a region range of the first data, the processor estimates, from a coordinate position and the region range of the first data in the first image data and a coordinate position of the first data in the second image data, a range of the second image data displayed on the display device after the scroll operation.

3. The terminal apparatus according to claim 2, wherein a region size of the buffer memory is set according to an estimated range of the second data displayed on the display device after the scroll operation.

4. The terminal apparatus according to claim 1, wherein, when a region range of the second data is not included in a region range of the first data and when the first data and the second data are displayed in one screen after the scroll operation, the processor estimates, from a coordinate position and the region range of the first data in the second image data and a coordinate position and the region range of the second data in the second image data, a range of the second data displayed on the display device after the scroll operation.

5. A screen updating method for causing a computer, which includes a buffer memory that stores display information concerning image data displayed on a display device, to execute:
   storing, by a processor, according to scroll operation of the display device, the display information including first data that overlaps between first image data displayed on the display device before the scroll operation and second image data displayed on the display device after the scroll operation, and second data added to the second image data based on the scroll operation, in the buffer memory; and
   updating, by the processor, according to the scroll operation after the second image data is displayed on the display device, in response to update of a display position of the display information stored in the buffer memory, the image data displayed on the display device based on the display information, a display position of which is updated.

6. The screen updating method according to claim 5, wherein the updating includes, when a region range of the second data is included in a region range of the first data, estimating, from a coordinate position and the region range of the first data in the first image data and a coordinate position of the first data in the second image data, a range of the second image data displayed on the display device after the scroll operation.

7. The screen updating method according to claim 6, wherein a region size of the buffer memory is set according to an estimated range of the second data displayed on the display device after the scroll operation.

8. The screen updating method according to claim 5, wherein the updating includes, when a region range of the second data is not included in a region range of the first data and when the first data and the second data are displayed in one screen after the scroll operation, estimating, from a coordinate position and the region range of the first data in the second image data and a coordinate position and the region range of the second data in the second image data, a range of the second data displayed on the display device after the scroll operation.

9. An information processing system comprising an information processing apparatus connected to a terminal apparatus, wherein the terminal apparatus includes:
   a buffer memory that stores display information concerning image data displayed on a display device; and
   a processor that stores, according to scroll operation of the display device, the display information including first data that overlaps between first image data displayed on the display device before the scroll operation and second image data displayed on the display device after the scroll operation, and second data added to the second image data based on the scroll operation, in the buffer memory, and updates, according to the scroll operation after the second image data is displayed on the display device, in response to update of a display position of the display information stored in the buffer memory, the image data displayed on the display device based on the display information, the display position of which is updated.

10. The information processing system according to claim 9, wherein, when a region range of the second data is included in a region range of the first data, the processor estimates, from a coordinate position and the region range of the first data in the first image data and a coordinate position of the first data in the second image data, a range of the second image data displayed on the display device after the scroll operation.

11. The information processing system according to claim 10, wherein a region size of the buffer memory is set according to an estimated range of the second data displayed on the display device after the scroll operation.

12. The information processing system according to claim 9, wherein, when a region range of the second data is not included in a region range of the first data and when the first data and the second data are displayed in one screen after the scroll operation, the processor estimates, from a coordinate position and the region range of the first data in the second image data and a coordinate position and the region range of the second data in the second image data, a range of the second data displayed on the display device after the scroll operation.

* * * * *